(12) United States Patent  
Kuwae et al.

(10) Patent No.: US 12,246,655 B2
(45) Date of Patent: Mar. 11, 2025

(54) AUTOMATED MOVING PLATFORM

(71) Applicant: MOTIONAL AD LLC, Boston, MA (US)

(72) Inventors: Lucas Kuwae, Singapore (SG); Alejandro Barragan, Singapore (SG); Tan Tian Fu, Singapore (SG)

(73) Assignee: MOTIONAL AD LLC, Boston, MA (US)

( * ) Notice: Subject to any disclaimer, the term of this patent is extended or adjusted under 35 U.S.C. 154(b) by 125 days.

(21) Appl. No.: 18/056,168

(22) Filed: Nov. 16, 2022

(65) Prior Publication Data

US 2023/0085010 A1 Mar. 16, 2023

Related U.S. Application Data

(63) Continuation of application No. 17/330,112, filed on May 25, 2021, now Pat. No. 11,505,134.

(51) Int. Cl.
*B60R 11/04* (2006.01)
*G01M 17/007* (2006.01)
*B60R 11/00* (2006.01)

(52) U.S. Cl.
CPC .......... *B60R 11/04* (2013.01); *G01M 17/007* (2013.01); *B60R 2011/0084* (2013.01); *B60R 2011/0092* (2013.01); *B60R 2300/301* (2013.01)

(58) Field of Classification Search
CPC ............. B60R 11/04; B60R 2011/0084; B60R 2011/0092; B60R 2300/301; G01M 17/007
USPC ........................................................ 348/148
See application file for complete search history.

(56) References Cited

U.S. PATENT DOCUMENTS

| | | |
|---|---|---|
| 10,063,815 B1 | 8/2018 | Spivey et al. |
| 11,505,134 B1 | 11/2022 | Kuwae et al. |
| 11,724,710 B2 * | 8/2023 | Jiao ............... B60W 40/08 701/23 |
| 2013/0018528 A1 | 1/2013 | Kelly et al. |
| 2015/0274165 A1 | 10/2015 | von Collani et al. |
| 2017/0136842 A1 | 5/2017 | Anderson et al. |

(Continued)

FOREIGN PATENT DOCUMENTS

| | | | | |
|---|---|---|---|---|
| CN | 108181609 | * | 6/2018 | ............... G01S 5/16 |
| CN | 108986449 A | * | 12/2018 | ............... G08G 1/00 |

(Continued)

OTHER PUBLICATIONS

Korean Office Action issued for Application No. KR 10-2021-0183051, dated Jun. 21, 2023.

(Continued)

*Primary Examiner* — Behrooz M Senfi
(74) *Attorney, Agent, or Firm* — Knobbe Martens Olson & Bear LLP

(57) ABSTRACT

This disclosure describes systems and methods used in the development and validation of autonomous vehicles ability to track objects with sensors. This application describes a self-propelled autonomous platform and methods for carrying a pedestrian, cyclist or vehicular type target in a predetermined pattern during one or more testing runs. The self-propelled autonomous platform includes a sensor configured to retract within a platform housing of the self-propelled autonomous platform when being driven over during a test run.

20 Claims, 20 Drawing Sheets

(56) References Cited

U.S. PATENT DOCUMENTS

| | | | |
|---|---|---|---|
| 2018/0037172 A1 | 2/2018 | Nelson et al. | |
| 2020/0312154 A1* | 10/2020 | Mondello | H04W 4/40 |
| 2020/0378778 A1* | 12/2020 | Glazberg | G05D 1/0088 |
| 2021/0070245 A1 | 3/2021 | Amacker et al. | |
| 2021/0158693 A1* | 5/2021 | Sze | G08G 1/22 |
| 2022/0019229 A1* | 1/2022 | Klein | G08G 1/096741 |
| 2022/0075030 A1 | 3/2022 | D'Antonio et al. | |
| 2022/0075057 A1 | 3/2022 | Jones, II et al. | |
| 2022/0258726 A1* | 8/2022 | Okubo | G01C 21/3476 |
| 2023/0077360 A1* | 3/2023 | Rakshit | G06F 9/5027 |
| | | | 709/226 |

FOREIGN PATENT DOCUMENTS

| | | | | |
|---|---|---|---|---|
| CN | 217216750 U | * | 8/2022 | H04N 5/225 |
| DE | 11 2011 104 645 T5 | | 10/2013 | |
| GB | 2569774 A | | 7/2019 | |
| JP | 2017097783 | * | 6/2017 | G08G 1/015 |
| WO | WO-2015032500 | * | 3/2015 | G01S 19/45 |

OTHER PUBLICATIONS

Great Britain Office Action issued for Application No. GB 2116241.7, dated Jun. 20, 2022.
SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.
Korean Office Action issued for Application No. KR 10-2021-0183051, dated Jun. 27, 2024.

\* cited by examiner

AUTOMATED MOVING PLATFORM

CROSS-REFERENCE TO RELATED APPLICATION(S)

This application is a continuation of U.S. patent application Ser. No. 17/330,112, filed May 25, 2021, the entire disclosure of which is hereby incorporated by reference.

BACKGROUND

Technical Field

This description relates to a self-propelled autonomous platform and, in some embodiments, to a self-propelled autonomous platform configured to carry a target to test the performance of at least one autonomous vehicles.

Description of the Related Art

Autonomous vehicles can be used to transport people and/or cargo (e.g., packages, objects, or other items) from one location to another. For example, an autonomous vehicle can navigate to the location of a person, wait for the person to board the autonomous vehicle, and navigate to a specified destination (e.g., a location selected by the person). To navigate in the environment, these autonomous vehicles are equipped with various types of sensors to detect objects in the surroundings.

SUMMARY

Anticipating the behavior of objects using the sensors of an autonomous vehicle can be difficult. The present disclosure is directed to systems, methods, and computer program products for developing and validating the ability of the autonomous vehicle to track objects with the sensors. This application describes a self-propelled autonomous platform and methods for carrying an object representing a pedestrian, cyclist or vehicle during one or more testing runs.

In some embodiments, the one or more testing runs can include carrying (e.g., moving) the object in a predetermined pattern. The carriage of these targets in the predetermined pattern or patterns allows the autonomous vehicle to conduct tests to determine how accurately the sensors are able to detect and predict the behavior of objects in an environment surrounding an autonomous vehicle. Generally, the computer system is configured to receive input from one or more sensors of the vehicle, detect one or more objects in the environment surrounding the vehicle based on the received input, and operate the vehicle based upon the predicted behavior of the objects.

In some embodiments, a self-propelled platform includes a plurality of wheels; a motor configured to drive at least one of the plurality of wheels; a platform housing comprising a support surface configured to carry at least one target and a sloped periphery configured to accommodate passage of an autonomous vehicle over the platform housing; and a suspension comprising a plurality of springs coupling the plurality of wheels to the platform housing, the plurality of springs configured to transition the platform from a first state to a second state in response to a threshold amount of weight being applied to the platform housing, wherein the platform housing is lower in the second state than it is in the first state.

In some embodiments, provided is a self-propelled platform, including a sensor; at least one processing circuit; a wireless communication module; and at least one non-transitory storage media storing instructions which, when executed by the at least one processing circuit, cause performance of operations including: following a first movement route in accordance with a user input; recording a plurality of positions of the self-propelled platform based on data collected by the sensor while following the first movement route; and following a second movement route based on the plurality of positions in response to an autonomous vehicle arriving at a predetermined position.

These and other aspects, features, and implementations can be expressed as methods, apparatuses, systems, components, program products, means or steps for performing a function, and in other ways.

These and other aspects, features, and implementations will become apparent from the following descriptions, including the claims.

DETAILED DESCRIPTION

Figure 1:
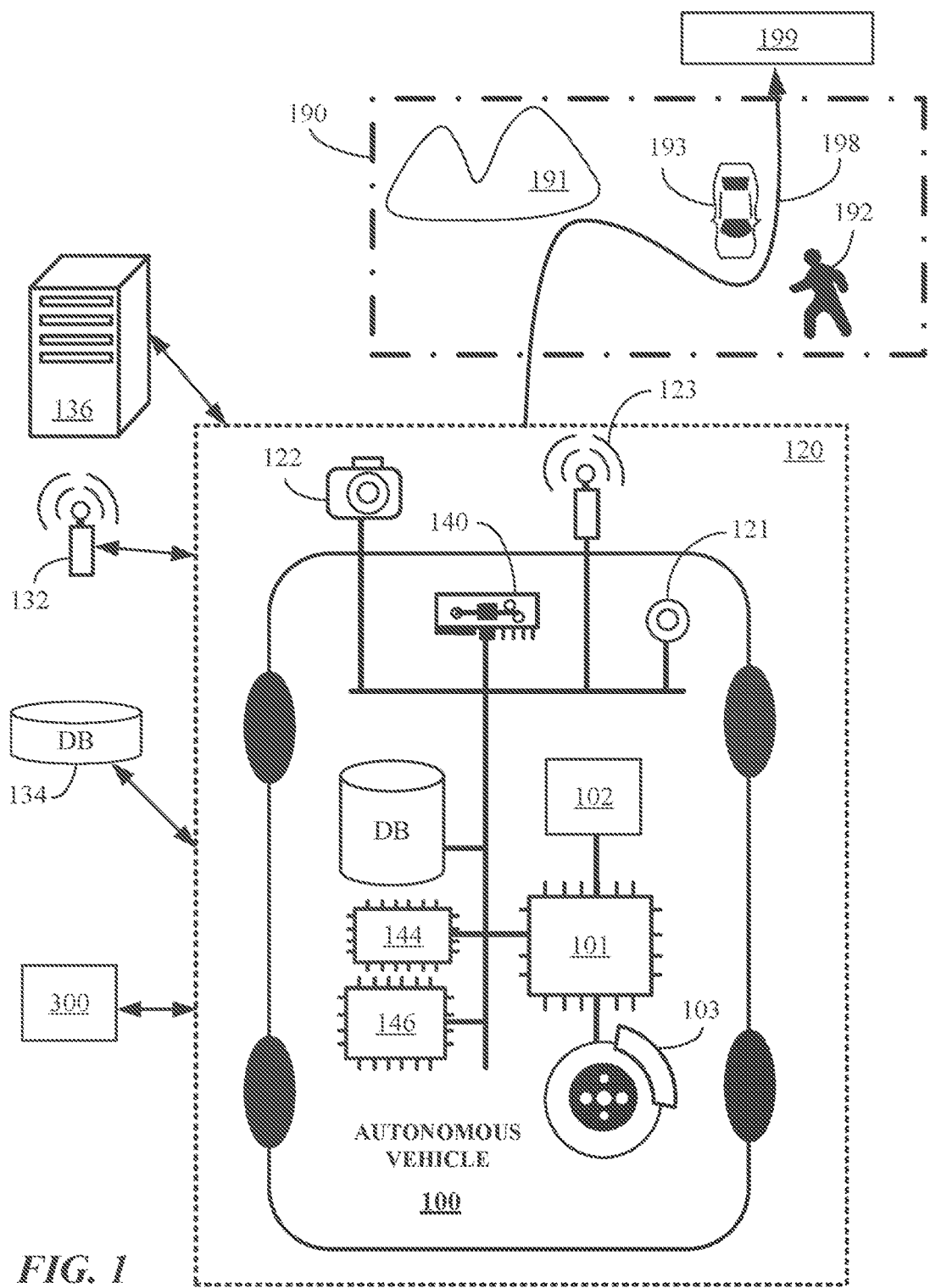
FIG. 1 shows an example of an autonomous vehicle having autonomous capability.

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. Hardware Overview
3. Autonomous Vehicle Architecture
4. Autonomous Vehicle Inputs
5. Autonomous Vehicle Planning
6. Autonomous Vehicle Control
7. Computing System for Object Detection Using Pillars
8. Example Point Clouds and Pillars
9. Example Process for Detecting Objects and Operating the Vehicle Based on the Detection of the Objects General Overview Autonomous vehicles driving in complex environments (e.g., an urban environment) pose a great technological challenge. In order for autonomous vehicles to navigate these environments, the vehicles detect various types of objects such as vehicles, pedestrians, and bikes in real-time using sensors such as LIDAR, optical imagery and/or RADAR. While these sensors are able to identify and track objects, predicting the behavior of the objects can be challenging and treating the tracked objects too conservatively can result in autonomous vehicles being unable to function. The disclosed embodiments include a low-profile self-propelled autonomous platform capable of carrying and maneuvering pedestrian, cyclist and/or vehicular type targets while testing one or more autonomous vehicles.

In particular, the system and techniques described herein enhance the ability of testers to comprehensively validate the ability of an autonomous navigation system of an autonomous vehicle to safely navigate a road or intersection. The described platform includes a retractable sensor that allows the platform to track nearby objects and the autonomous vehicle during one or more test runs. The retractable nature of the sensor allows it to be positioned in a location with good visibility with minimal risk of damage being done to the sensor in the event the platform comes into contact with the autonomous vehicle. The onboard sensor also allows the platform to maneuver relative to dynamic objects that may not always follow the same path. In this way, the platform has more flexibility and does not need to be reprogramed or redirected every time a scenario is adjusted.

Hardware Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to a second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle, and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless specified otherwise.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 200 described below with respect to FIG. 2.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level I vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, WiFi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

In an embodiment, AV system 120 can be incorporated into an autonomous platform configured to carry a target suitable for testing performance of sensors of AV 100 and is described and depicted in greater detail below in FIGS. 11A-16. The autonomous platform can be configured with steering controller 102, brakes 103, communication devices 140 and one or more processors for receiving and processing instructions in the form of computer code stored on local or remote computer storage. The autonomous platform can also include one or more sensors 121 that can include a LIDAR sensor, a video camera, a GPS receiver and the like. In some embodiments, one or more of sensors 121 can be used by the autonomous platform to refine a desired position or path taken by the autonomous platform with respect to its environment and or the AV 100 it is being used to test.

Figure 2:
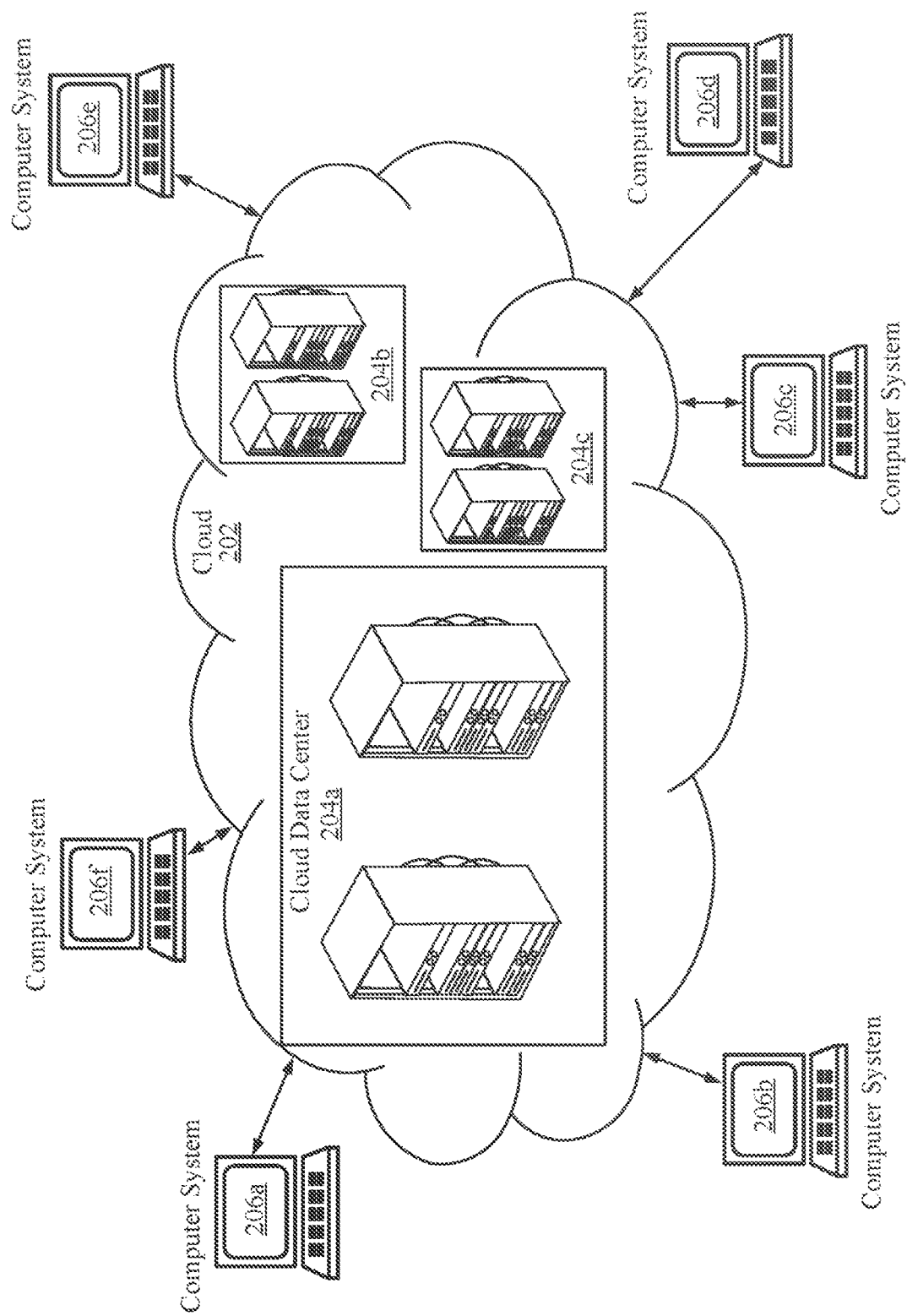
FIG. 2 illustrates an example "cloud" computing environment.

FIG. 2 illustrates an example "cloud" computing environment. Cloud computing is a model of service delivery for enabling convenient, on-demand network access to a shared pool of configurable computing resources (e.g., networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Figure 3:
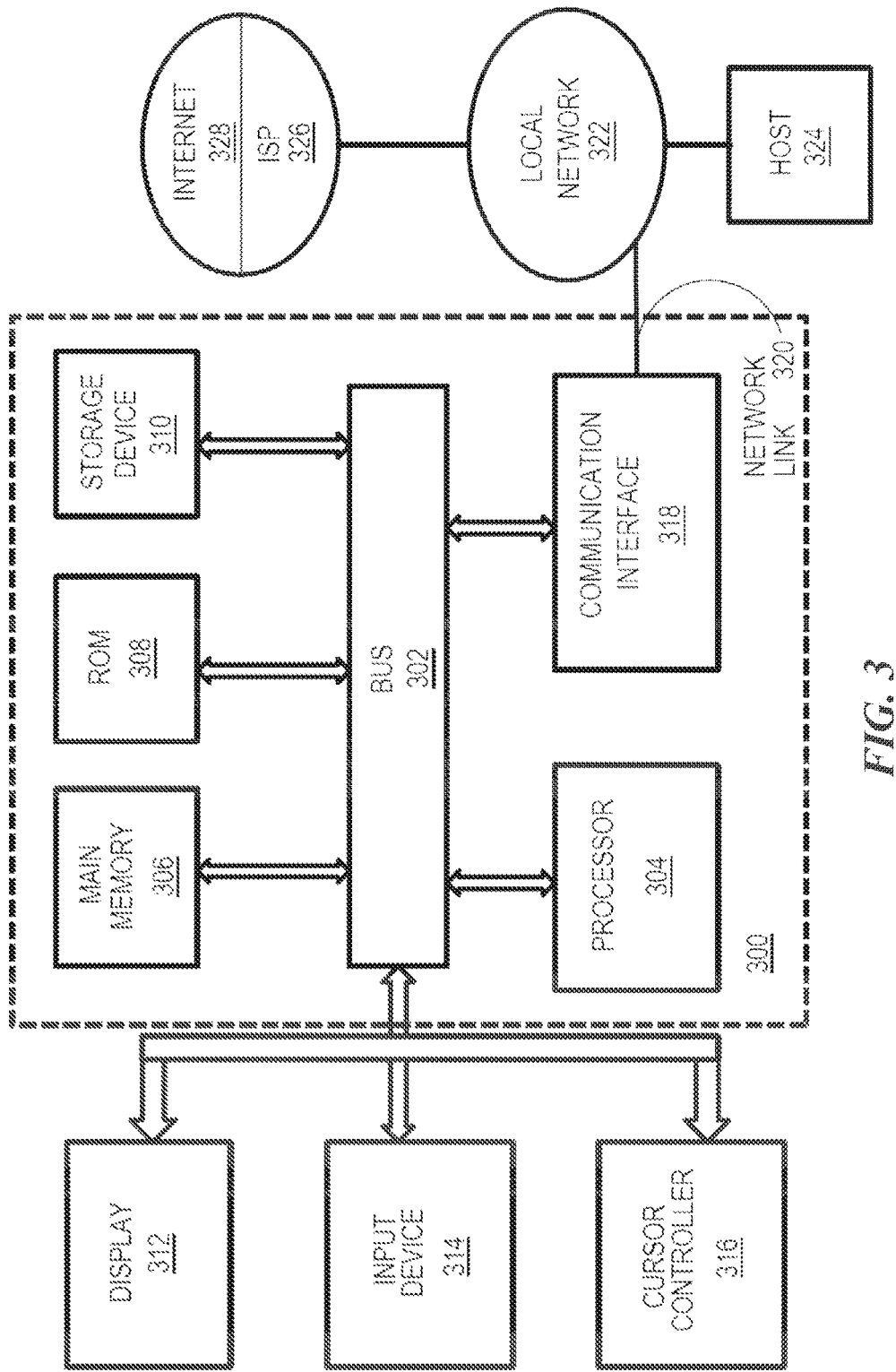
FIG. 3 illustrates a computer system.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
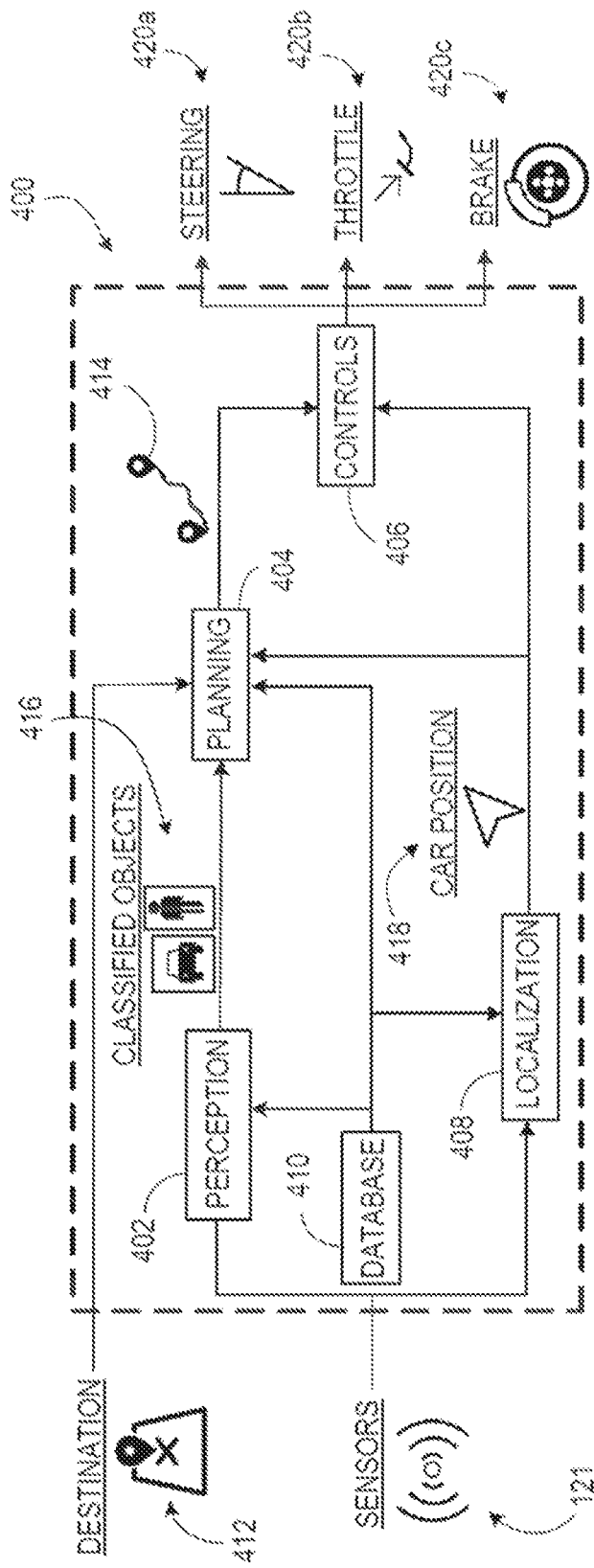
FIG. 4 shows an example architecture for an autonomous vehicle.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
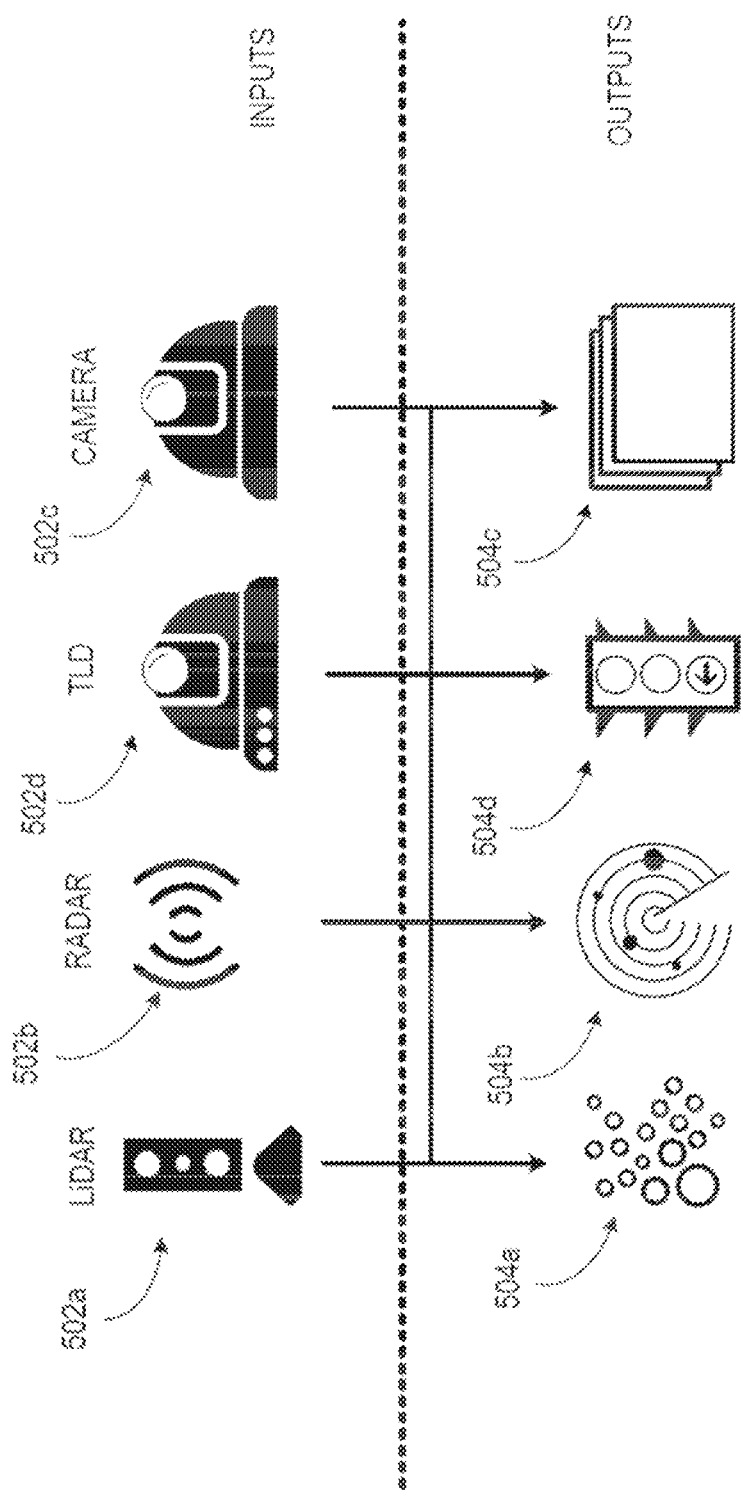
FIG. 5 shows an example of inputs and outputs that may be used by a perception module.

FIG. 5 shows an example of inputs 502a-d (e.g., sensors 121 shown in FIG. 1) and outputs 504a-d (e.g., sensor data) that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system 502b produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504*c*. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502*d* is a traffic light detection (TLD) system. A TLD system uses one or more cameras to obtain information about traffic lights, street signs, and other physical objects that provide visual navigation information. A TLD system produces TLD data as output 504*d*. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system may be about 120 degrees or more.

In some embodiments, outputs 504*a-d* are combined using a sensor fusion technique. Thus, either the individual outputs 504*a-d* are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 6:
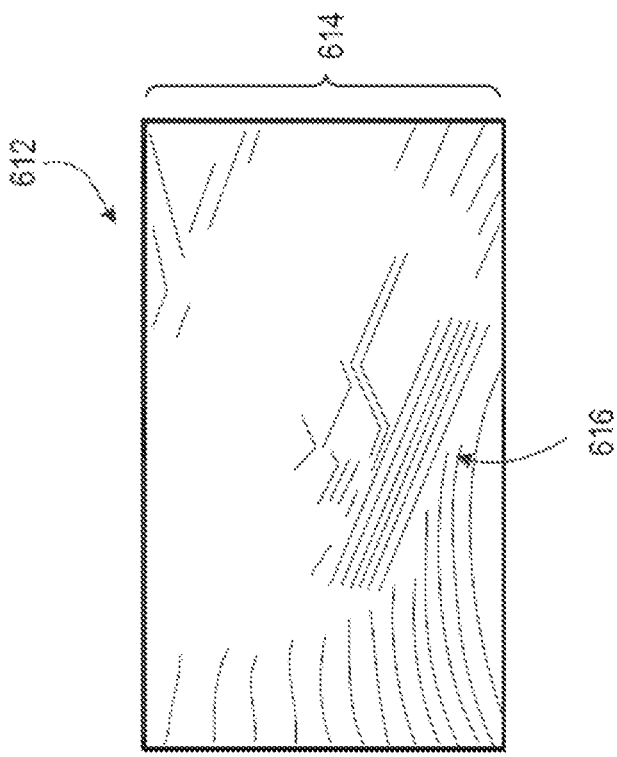
FIG. 6 shows an example of a LiDAR system.
Figure 6:
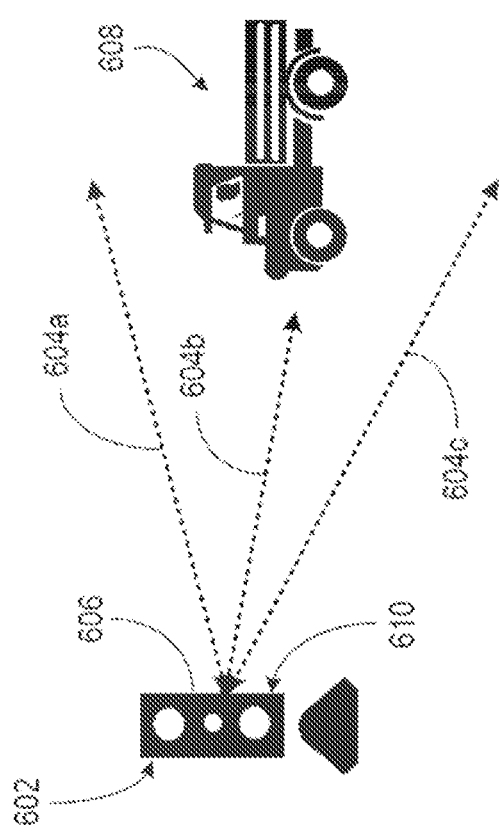

FIG. 6 shows an example of a LiDAR system 602 (e.g., the input 502*a* shown in FIG. 5). The LiDAR system 602 emits light 604*a-c* from a light emitter 606 (e.g., a laser transmitter). Light emitted by a LiDAR system is typically not in the visible spectrum; for example, infrared light is often used. Some of the light 604*b* emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
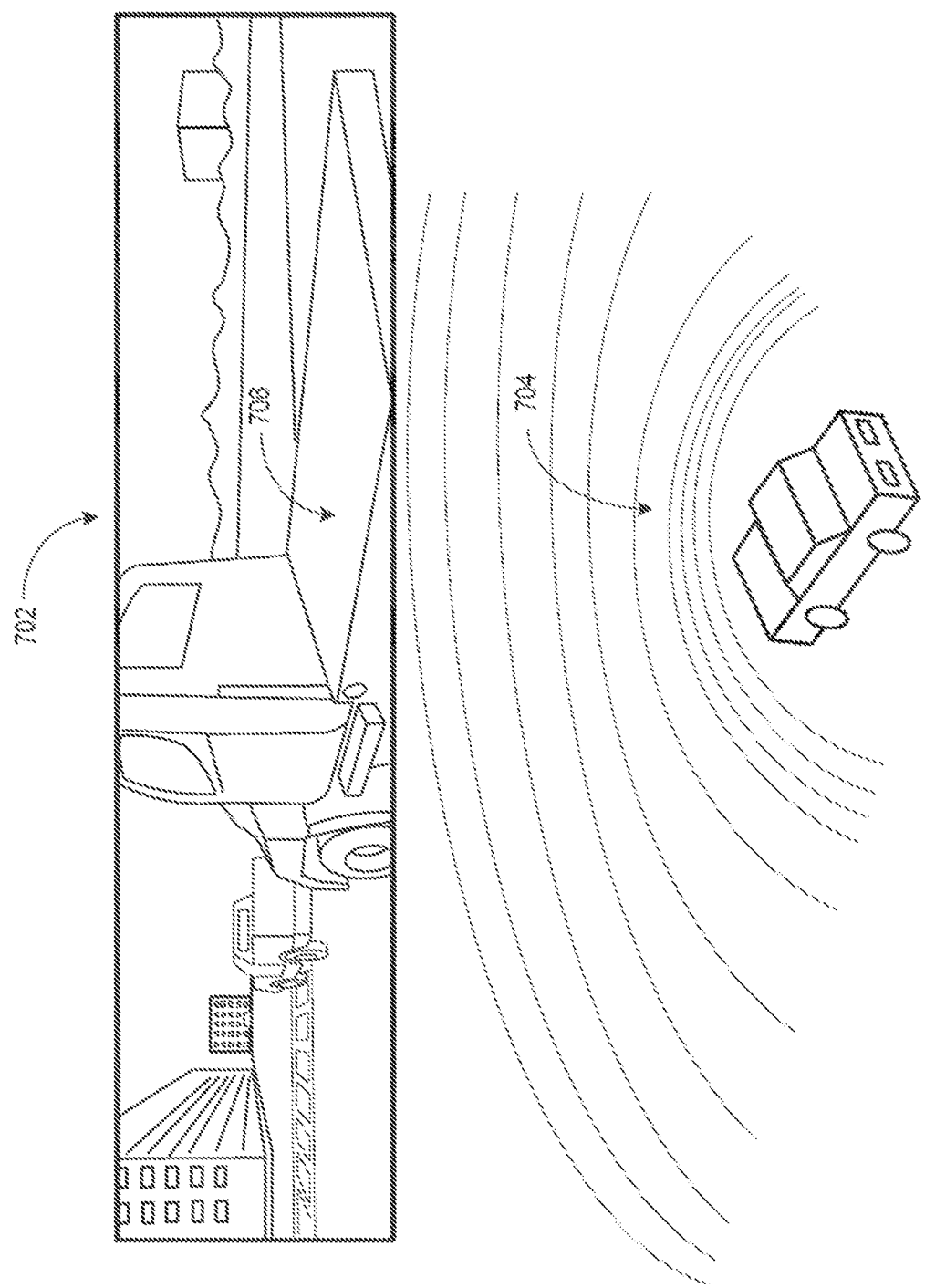
FIG. 7 shows the LiDAR system in operation.

FIG. 7 shows the LiDAR system 602 in operation. In the scenario shown in this figure, the AV 100 receives both camera system output 504*c* in the form of an image 702 and LiDAR system output 504*a* in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
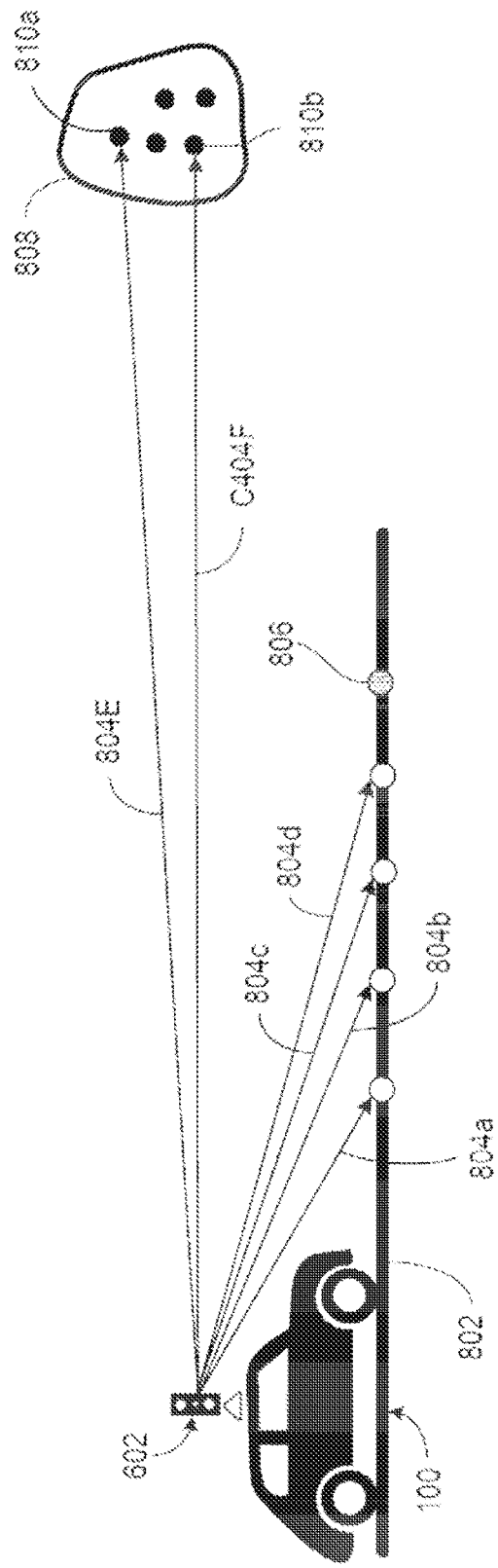
FIG. 8 shows the operation of the LiDAR system in additional detail.

FIG. 8 shows the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804*a-d* emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804*e-f* emitted by the LiDAR system 602 will be reflected from points 810*a-b* in a manner inconsistent with the expected consistent manner. From this information, the AV 100 can determine that the object 808 is present.

Autonomous Vehicle Control

Figure 9:
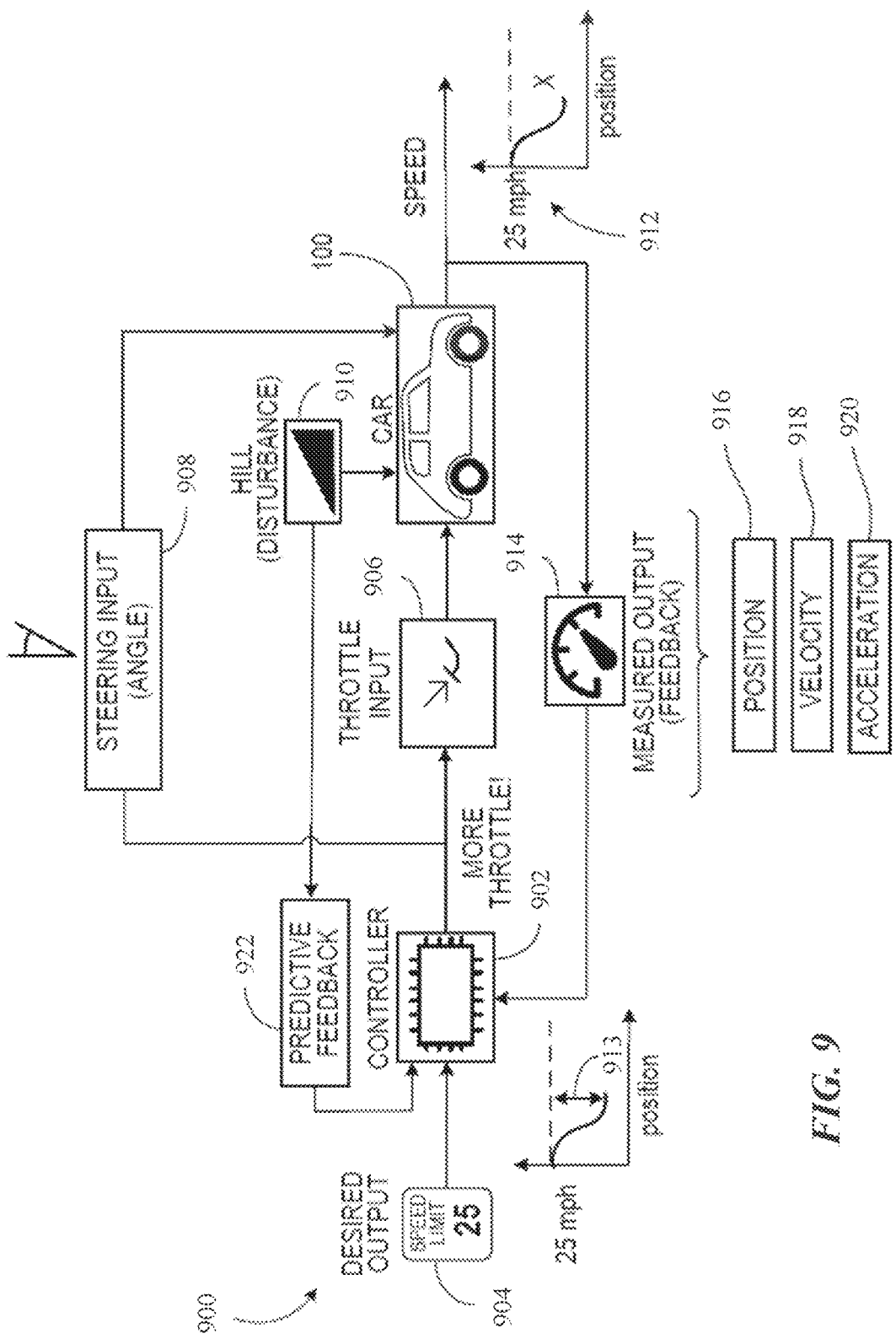
FIG. 9 shows a block diagram of the inputs and outputs of a control module.

FIG. 9 shows a block diagram 900 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 308, and storage device 310, and instructions stored in memory that carry out operations of the controller 902 when the instructions are executed (e.g., by the one or more processors).

In an embodiment, the controller 902 receives data representing a desired output 904. The desired output 904 typically includes a velocity, e.g., a speed and a heading. The desired output 904 can be based on, for example, data received from a planning module 404 (e.g., as shown in FIG. 4). In accordance with the desired output 904, the controller 902 produces data usable as a throttle input 906 and a steering input 908. The throttle input 1106 represents the magnitude in which to engage the throttle (e.g., acceleration control) of an AV 100, e.g., by engaging the steering pedal, or engaging another throttle control, to achieve the desired output 904. In some examples, the throttle input 1106 also includes data usable to engage the brake (e.g., deceleration control) of the AV 100. The steering input 908 represents a steering angle, e.g., the angle at which the steering control (e.g., steering wheel, steering angle actuator, or other functionality for controlling steering angle) of the AV should be positioned to achieve the desired output 904.

In an embodiment, the controller 902 receives feedback that is used in adjusting the inputs provided to the throttle and steering. For example, if the AV 100 encounters a disturbance 910, such as a hill, the measured speed 912 of the AV 100 is lowered below the desired output speed. In an embodiment, any measured output 914 is provided to the controller 902 so that the necessary adjustments are performed, e.g., based on the differential 913 between the measured speed and desired output. The measured output 914 includes measured position 916, measured velocity 918, (including speed and heading), measured acceleration 920, and other outputs measurable by sensors of the AV 100.

In an embodiment, information about the disturbance 910 is detected in advance, e.g., by a sensor such as a camera or LiDAR sensor, and provided to a predictive feedback module 922. The predictive feedback module 922 then provides information to the controller 902 that the controller 902 can use to adjust accordingly. For example, if the sensors of the AV 100 detect ("see") a hill, this information can be used by the controller 902 to prepare to engage the throttle at the appropriate time to avoid significant deceleration.

Figure 10:
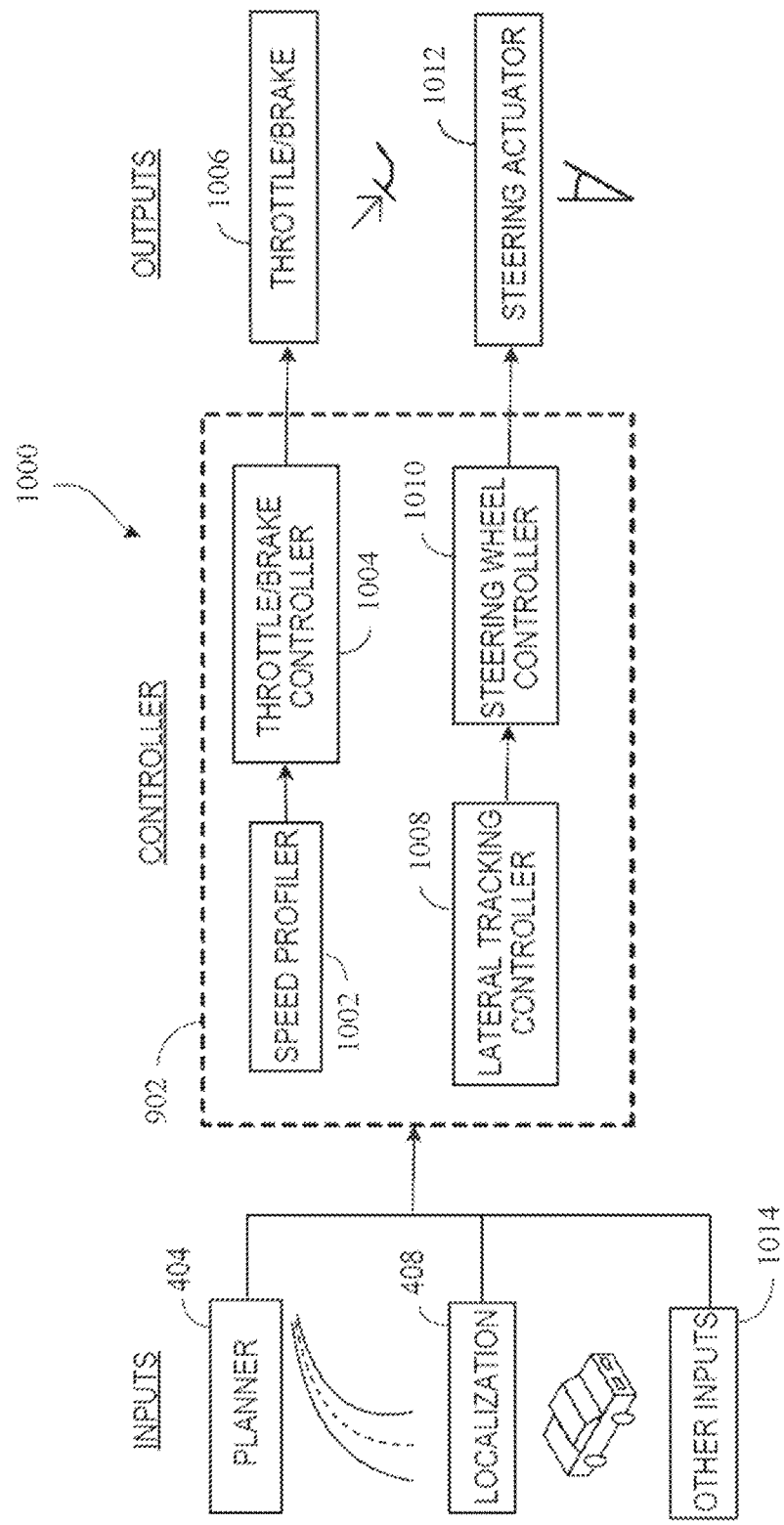
FIG. 10 shows a block diagram of the inputs, outputs, and components of a controller.

FIG. 10 shows a block diagram 1000 of the inputs, outputs, and components of the controller 902. The controller 902 has a speed profiler 1002 which affects the operation of a throttle/brake controller 1004. For example, the speed profiler 1002 instructs the throttle/brake controller 1004 to engage acceleration or engage deceleration using the throttle/brake 1006 depending on, e.g., feedback received by the controller 902 and processed by the speed profiler 1002.

The controller 902 also has a lateral tracking controller 1008 which affects the operation of a steering controller 1010. For example, the lateral tracking controller 1008 instructs the steering controller 1010 to adjust the position of the steering angle actuator 1012 depending on, e.g., feedback received by the controller 902 and processed by the lateral tracking controller 1008.

The controller 902 receives several inputs used to determine how to control the throttle/brake 1006 and steering angle actuator 1012. A planning module 404 provides information used by the controller 902, for example, to choose a heading when the AV 100 begins operation and to determine which road segment to traverse when the AV 100 reaches an intersection. A localization module 408 provides information to the controller 902 describing the current location of the AV 100, for example, so that the controller 902 can determine if the AV 100 is at a location expected based on the manner in which the throttle/brake 1006 and steering angle actuator 1012 are being controlled. In an embodiment, the controller 902 receives information from other inputs 1014, e.g., information received from databases, computer networks, etc.

Design of Self-Propelled Autonomous Testing Platform

Figure 11A:
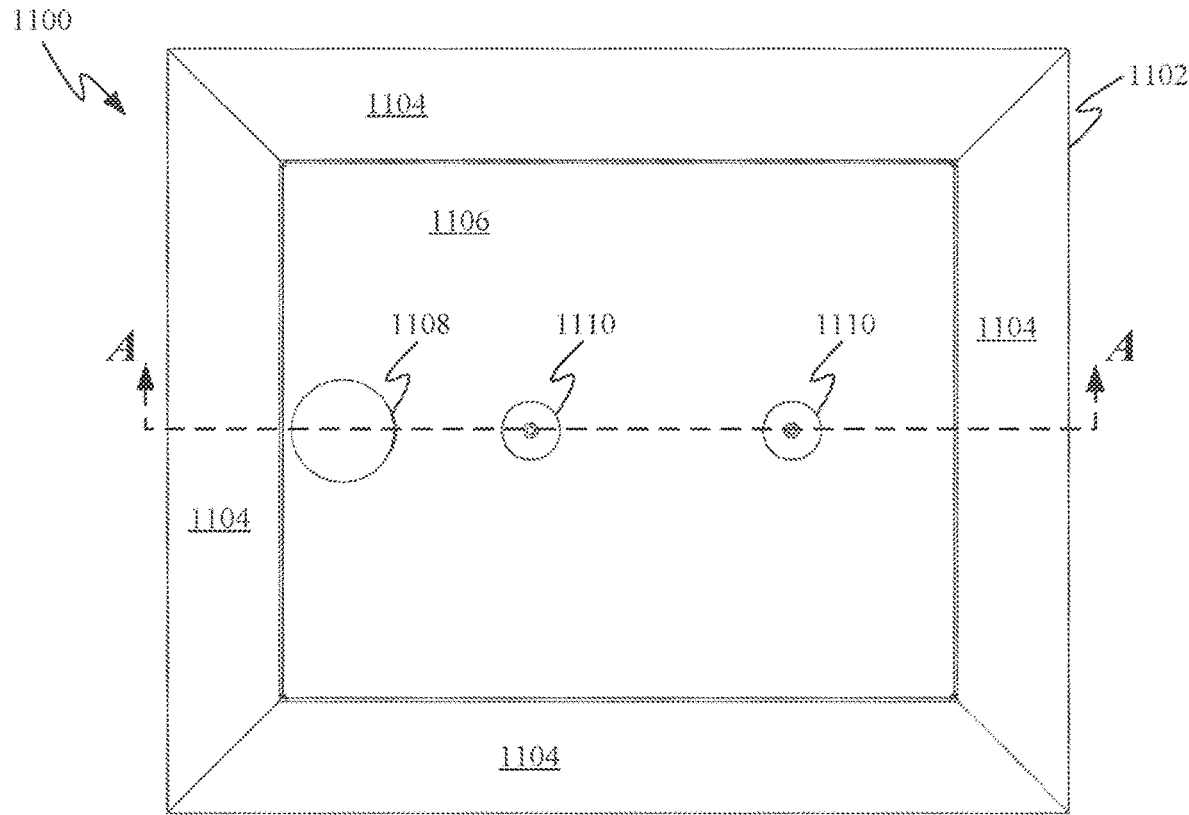
FIGS. 11A-11C show various views of a self-propelled autonomous platform useful for testing the autonomous navigation system of an autonomous vehicle.
Figure 11B:
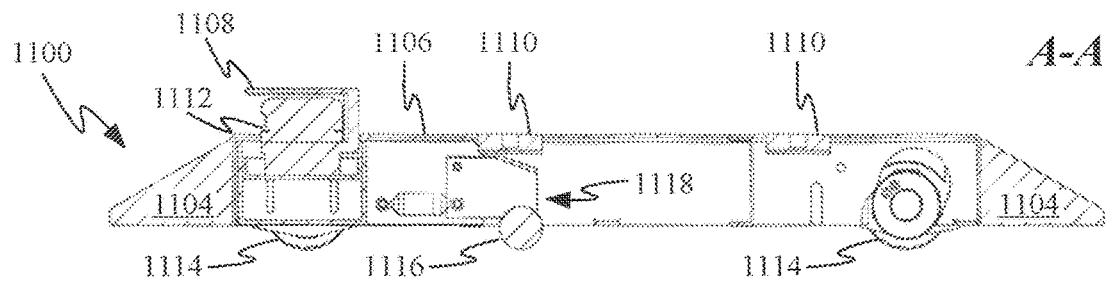
Figure 11C:
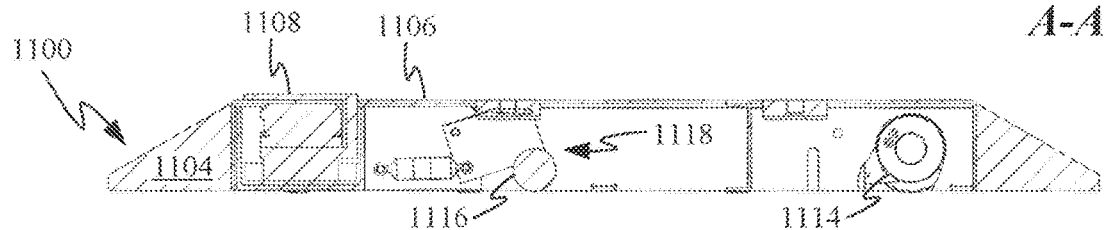

FIGS. 11A-11C show various views of a self-propelled autonomous platform 1100 useful for testing the autonomous navigation system of an autonomous vehicle similar to AV 100. FIG. 11A shows a top view of platform 1100. Platform 1100 includes platform housing 1102, which can take the form of a rigid structure having a sloped periphery 1104 that allows vehicles to drive over platform 1100 without damaging the vehicles or platform 1100. In some embodiments the sloped periphery can have a linear incline and in some embodiments sloped periphery 1104 can have a non-linear incline (e.g., a concave or convex arced incline and/or the like). A central region of platform housing 1102 can include a flat or sloped support surface 1106 configured to support at least one target capable of detection by one or more sensors of AV 100. When platform 1100 includes an optical sensor, support surface 1106 can includes a sensor cover 1108 that forms a portion of support surface 1106 when a vehicle drives over platform 1100. Support surface 1106 also includes magnetic attachment points 1110, which are configured to attach to a target support structure. The target support structure includes a base with a magnet or magnetically attractable material that is able to magnetically interact and attach to magnetic attachment points 1110. In some embodiments, magnetic attachment points 1110 can take the form of magnetically attractable material that magnetically couples to a magnet that is incorporated into the base of the target support structure. Once securely attached to one or both of magnetic attachment points 1110, the target support structure can be used to keep a target upright and stable while platform 1100 moves around.

FIG. 11B shows a cross-sectional view of platform 1100 in a first state in accordance with section line A-A The first state can also be referred to as a normal operating state in which platform 1100 remains until platform housing 1102 receives a threshold amount of force. In this first state sensor cover 1108 is elevated above support surface 1106, which allows sensor 1112 an unobstructed view outside of platform housing 1102. In some embodiments, sensor 1112 allows platform 1100 to adjust its speed relative to another platform or vehicle during a test based on data generated by sensor 1112. As depicted, wheels 1114 protrude from a downward facing surface of platform housing 1102. Wheels 1114 can be driven by one or more motors disposed within platform housing 1102. FIG. 11B also shows a wheel 1116 associated with sensor retraction mechanism 1118.

FIG. 11C shows a cross-sectional view of platform 1100 in a second state in accordance with section line A-A The second state can also be referred to as a stationary state, since platform 1100 is not capable of propelling itself in this state. In this second state sensor cover 1108 is flush or substantially flush with support surface 1106. This retracted position of sensor 1112, prevents sensor 1112 from sustaining damage in the event a wheel of AV 100 happens to run directly over sensor cover 1108. FIG. 11C also shows how wheels 1114 and wheel 1116 retract into platform housing 1102 in the second state. Wheels 1114 and wheel 1116 are kept in the first state by sturdy springs that are configured to compress or extend only once a threshold amount of force is applied to platform housing 1102. This disclosed structure allows platform 1100 to have a low-profile of less than about 80 mm in height, which makes the platform more aerodynamic and does not substantially increase the height of targets it carries. In this way, targets having proportions consistent with normal human or vehicular height can be used without having to adjust their height.

Figure 12:
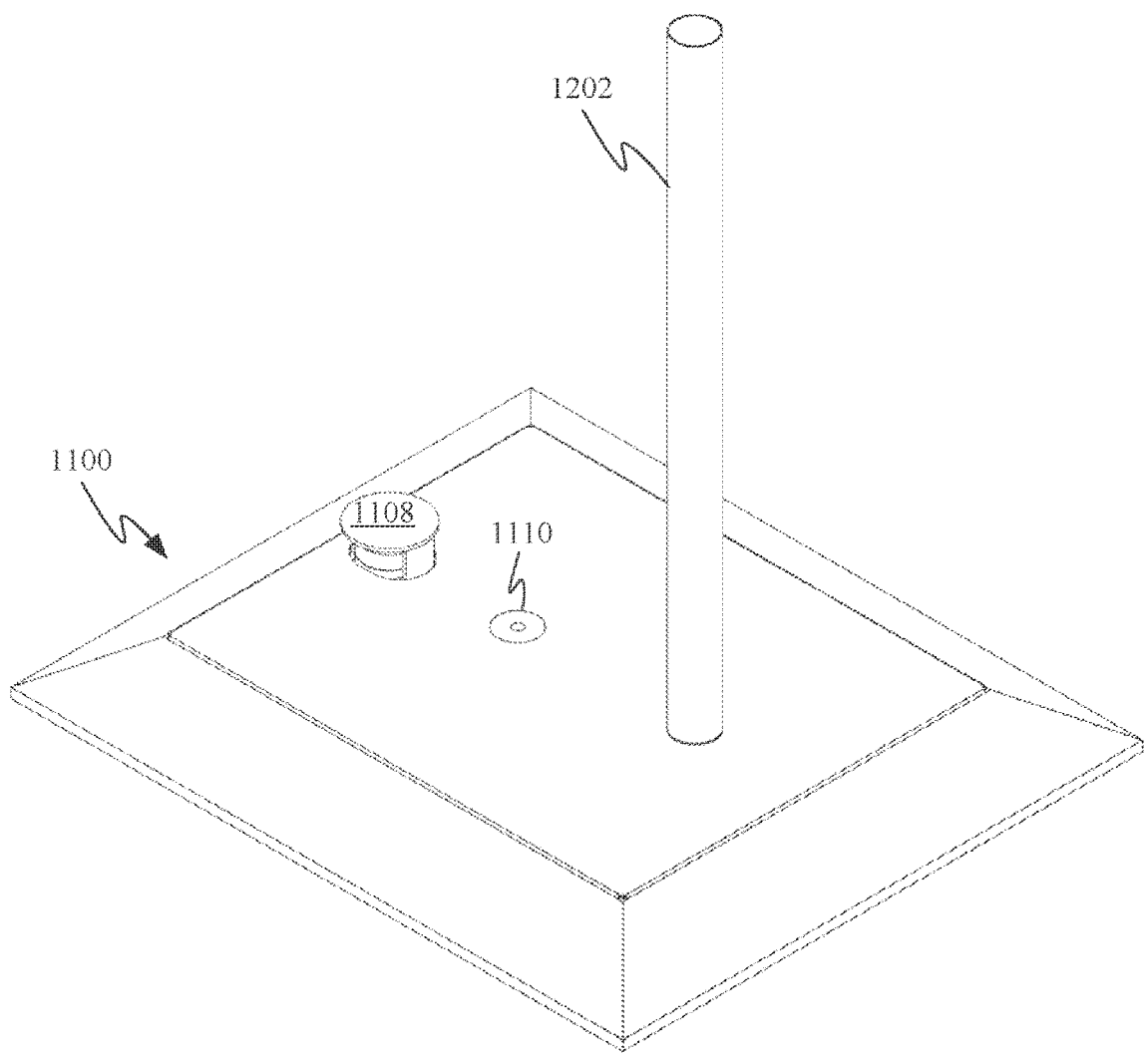
FIG. 12 shows a rear facing perspective view of the platform depicted in FIGS. 11A-11C.

FIG. 12 shows a rear facing perspective view of platform 1100. In particular, a target support structure 1202 taking the form of a cylindrical beam is shown attached to a rear magnetic attachment point of platform housing 1102. On account of the coupling between target support structure 1202 being magnetically coupled to platform housing 1102, in the event a target attached to target support structure 1402 is hit by AV 100, both the target and target support structure 1202 can detach easily from platform housing 1102 without doing substantial damage to platform 1100 or AV 100. It should be appreciated that target support structure 1402 can take different forms. For example, target support structure 1402 could have target attachment features that allow target support structure to be securely attached to a target, thereby preventing inadvertent detachment of the target from platform 1100.

Figure 13:
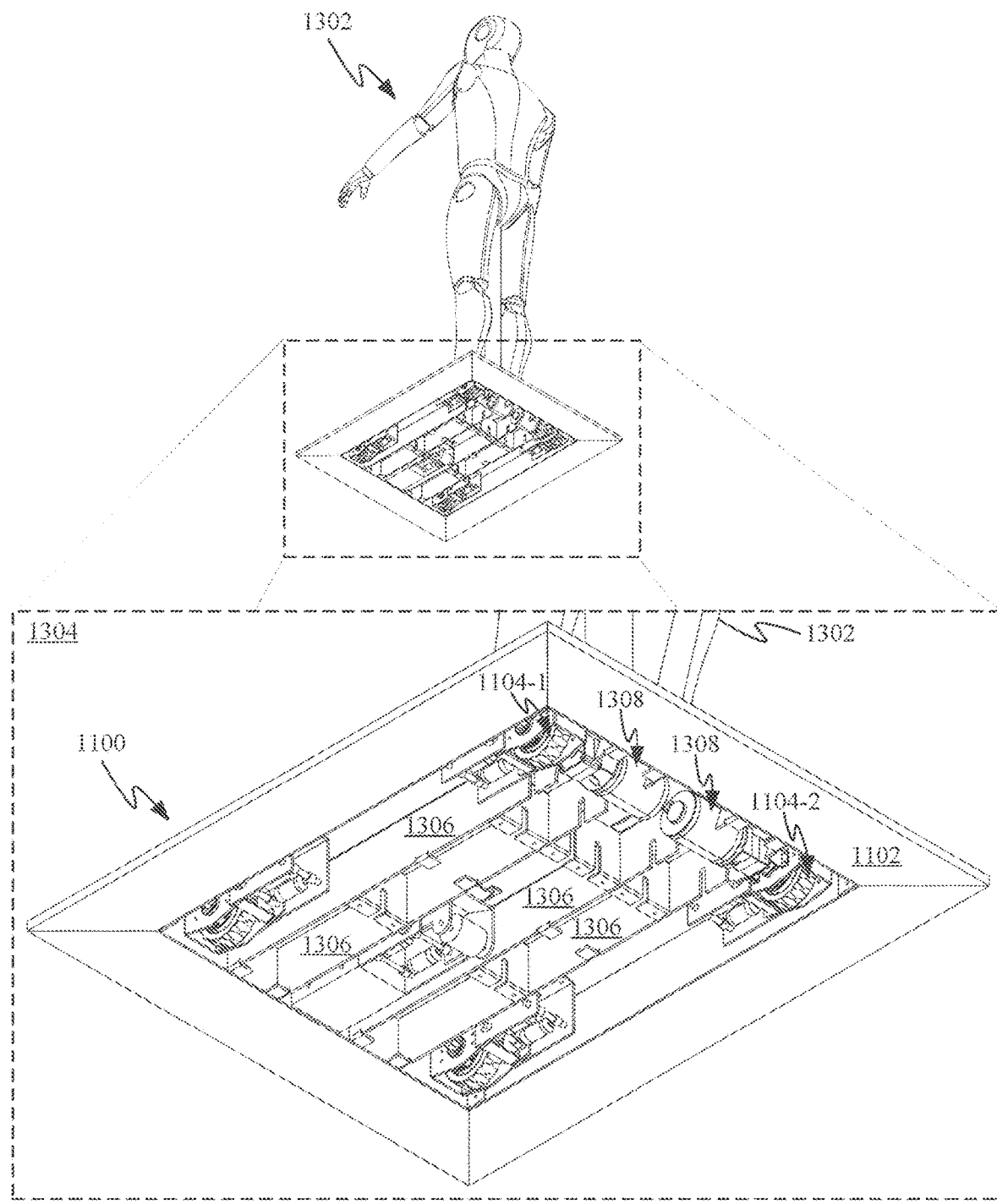
FIG. 13 shows a perspective view of a downward facing surface of the platform depicted in FIGS. 11A-12.

FIG. 13 shows a perspective view of a downward facing surface of platform 1100. Target 1302 is shown attached to an upward facing surface of platform 1100. In some embodiments, target 1302 can be attached directly to one of the magnetic attachment points of platform housing 1102. It should be noted that while target 1302 is depicted as a pedestrian in FIG. 13, platform 1100 is capable of carrying other types of targets, such as person atop a bike or in cooperation with other platforms carry inflatable vehicle shaped targets.

FIG. 13 also shows a close up view 1304 of the downward facing surface of platform 1100 where platform 1100 is in the second state. As depicted, an interior of platform housing 1102 is substantially hollow allowing room for wheels 1104 and 1106 to retract between structural ribs 1304. Structural ribs 1306 help to keep platform housing 1102 rigid enough to structurally support the passage of AV 100 over platform housing 1102. Wheel assemblies attaching wheels 1114 to platform housing 1102 are attached by pins to one or more of structural ribs 1304. FIG. 13 also shows motors 1308, which are in axial alignment with wheels 1104-1 and 1104-2. In some embodiments, motors 1308 can be configured to move with wheels 1104 when platform 1100 changes from the second state to the first state to maintain the alignment of motors 1308 with wheels 1104. Having two motors 1308 allows platform 1100 to perform turns by applying differential inputs to motors 1308, thereby allowing platform 1100 to make left and right turns. The differential inputs can take many forms including differential power, control signals, electrical current, etc.

Figure 14A:
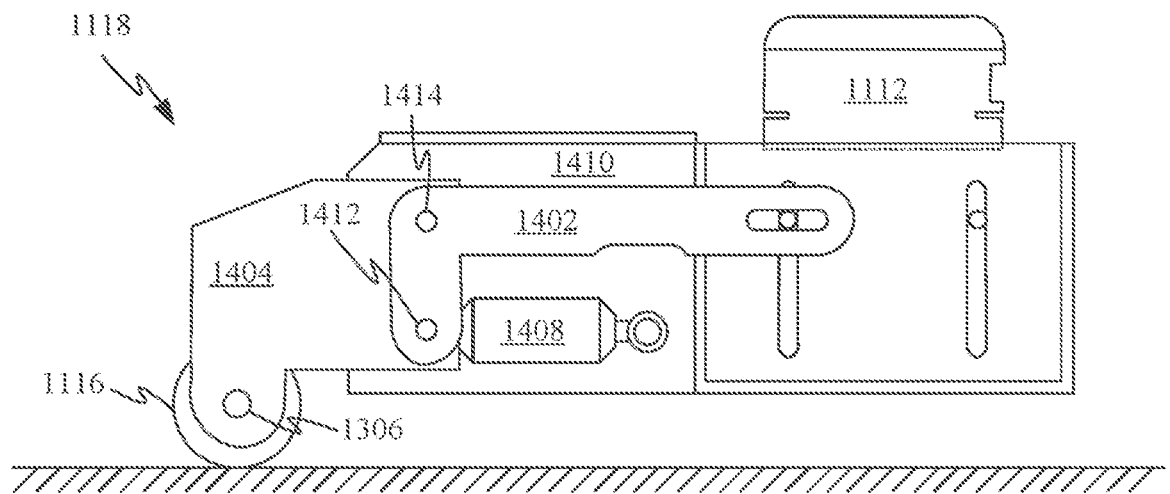
FIGS. 14A-14B show detailed view of a sensor retraction mechanism in the first and second states respectively.
Figure 14B:
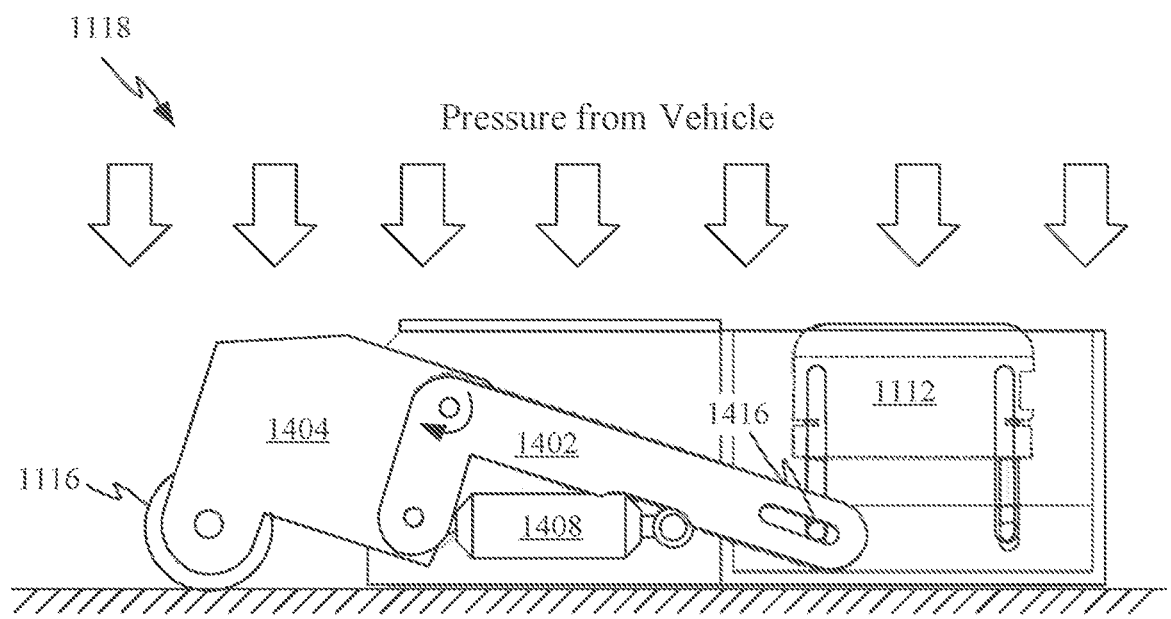

FIGS. 14A-14B show detailed view of sensor retraction mechanism 1118 in the first and second states respectively. FIG. 14A shows sensor 1112 protruding above support surface 1106. Sensor 1112 is mechanically coupled to wheel 1116 by way of linkage 1402, wheel support 1404 and axle 1406. While wheel support 1404 and linkage 1402 are shown as two different pieces, in some embodiments, these two pieces could be combined into a single piece. Wheel 1116 is kept in the position depicted in FIG. 14A by spring 1408. A first end of spring 1408 is secured to sensor retraction mechanism body 1410 and a second end of spring 1408 is secured to linkage 1402 at pin 1412. Spring 1408 is configured to prevent linkage 1402 from rotating about an axis defined by pin 1414 until a threshold amount of force is applied to platform housing 1102 at which point spring 1408 is configured to lengthen, thereby allowing linkage 1402 to rotate.

FIG. 14B shows a position of sensor retraction mechanism 1118 when platform 1100 is in the second state. Linkage 1402 is shown in a new position after spring 1408 lengthens to accommodate rotation of linkage 1402. Rotation of linkage 1402 results in the retraction of wheel 1116 into platform housing 1102 (not shown) and the retraction of sensor 1112 into platform housing 1102. Sensor 1112 retracts into platform housing 1102 and sensor retraction body 1410 on account of a distal end of 1402 pushing pin 1416 downward. Since pin 1416 is coupled to sensor 1112, sensor 1112 is retracted into platform housing 1112 as depicted.

Figure 15A:
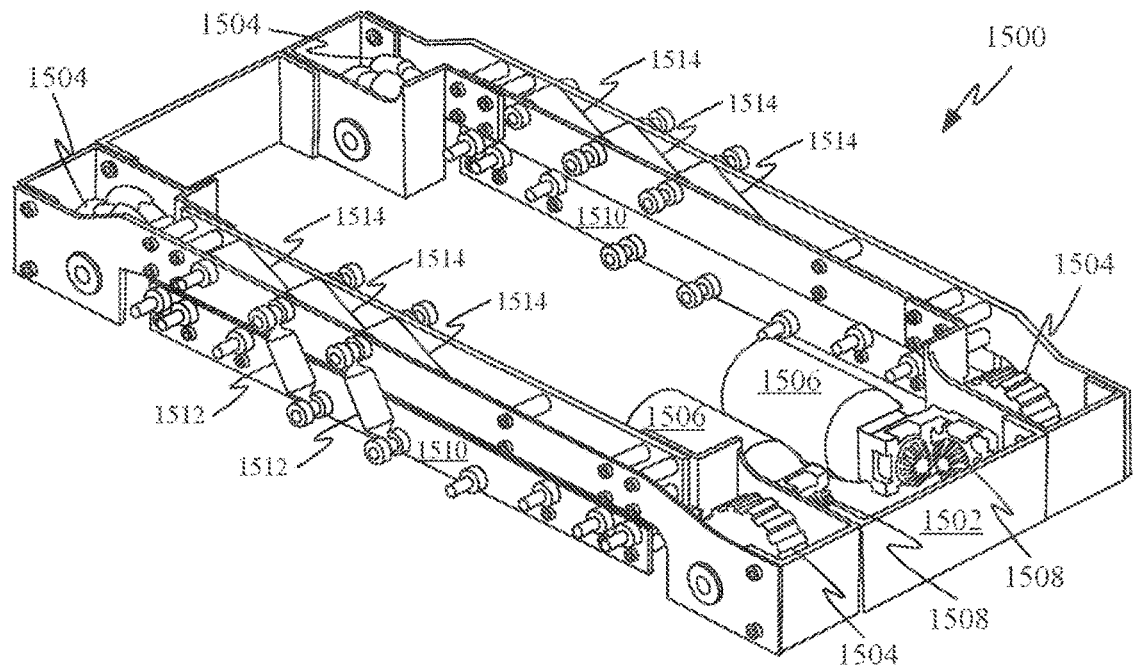
FIGS. 15A-15C show an alternative platform suspension to the suspension depicted in FIGS. 11A-14B.
Figure 15B:
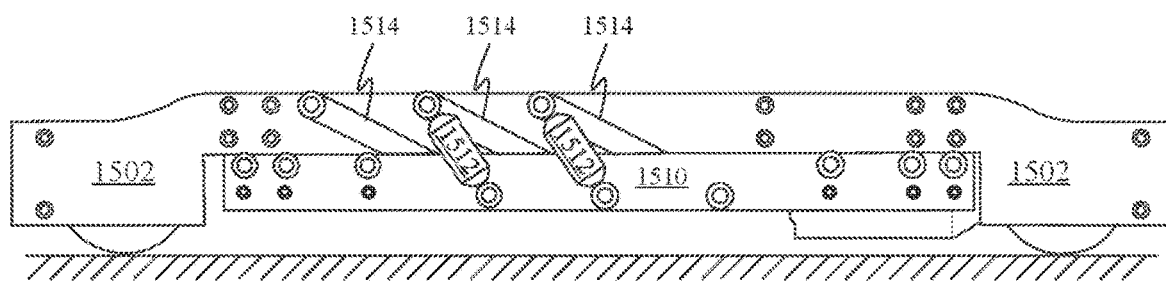
Figure 15C:
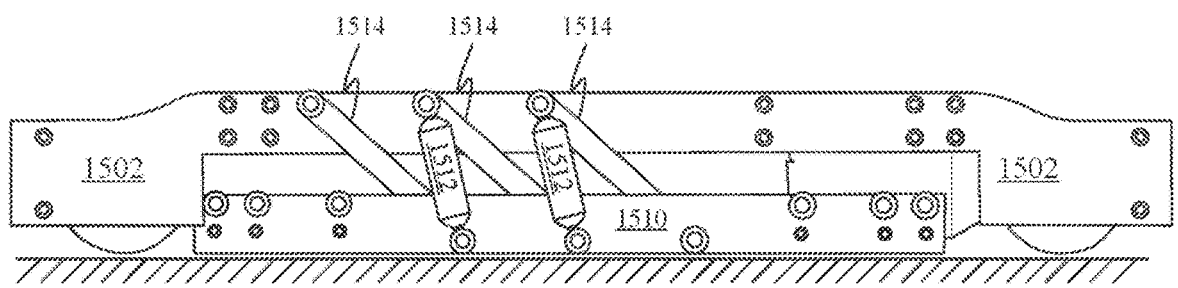

FIGS. 15A-15C show an alternative platform suspension. FIG. 15A shows a perspective view of platform suspension 1500. While platform 1100 has a suspension that includes individual springs for controlling the movement of each wheel, suspension 1500 includes a single chassis 1502 made of rigid material that attaches each of wheels 1504 to a platform housing. In this way, as the platform moves between a normal operating state and a stationary state, wheels 1504 all move together with chassis 1502. FIG. 15A also shows how motors 1506 are coupled to chassis 1502. Since both motors 1506 and wheels 1504 are attached to the chassis 1502, alignment between motors 1506 and wheels 1504 remains constant regardless of state. Motors 1506 engage wheels 1504 by way of bevel gearing 1508. Alternatively, suspension 1500 could be widened and drive shafts of motors 1506 could be aligned directly with the axes of rotation of the wheels similar to the configuration shown in FIG. 13.

Chassis 1502 is also coupled to housing brackets 1510 by multiple springs 1512 and linkages 1514. Springs 1512 prevent movement of chassis 1502 relative to housing brackets 1510 until a threshold amount of force is applied to them through a respective platform housing. Once springs 1512 begin to a stretch under the applied force, linkages 1514 are configured to control movement of chassis 1502 with respect to housing brackets 1510. Because housing brackets 1510 are both rigidly coupled to a respective platform housing, linkages 1514 also control the movement of chassis 1502 with respect to the respective platform housing.

FIGS. 15B and 15C show side views of suspension 1500 in normal and stationary states. The figures demonstrate how chassis 1502 moves upward and laterally with respect to housing brackets 1510 to facilitate retraction of chassis 1502 into the respective platform housing as springs 1512 extend. FIG. 15C also shows how wheels 1504 retract to an extent that they become even with a base of housing bracket 1510. In some embodiments, linkages 1514 can be configured such that wheels 1504 retract above the base of housing bracket 1510.

Figure 16:
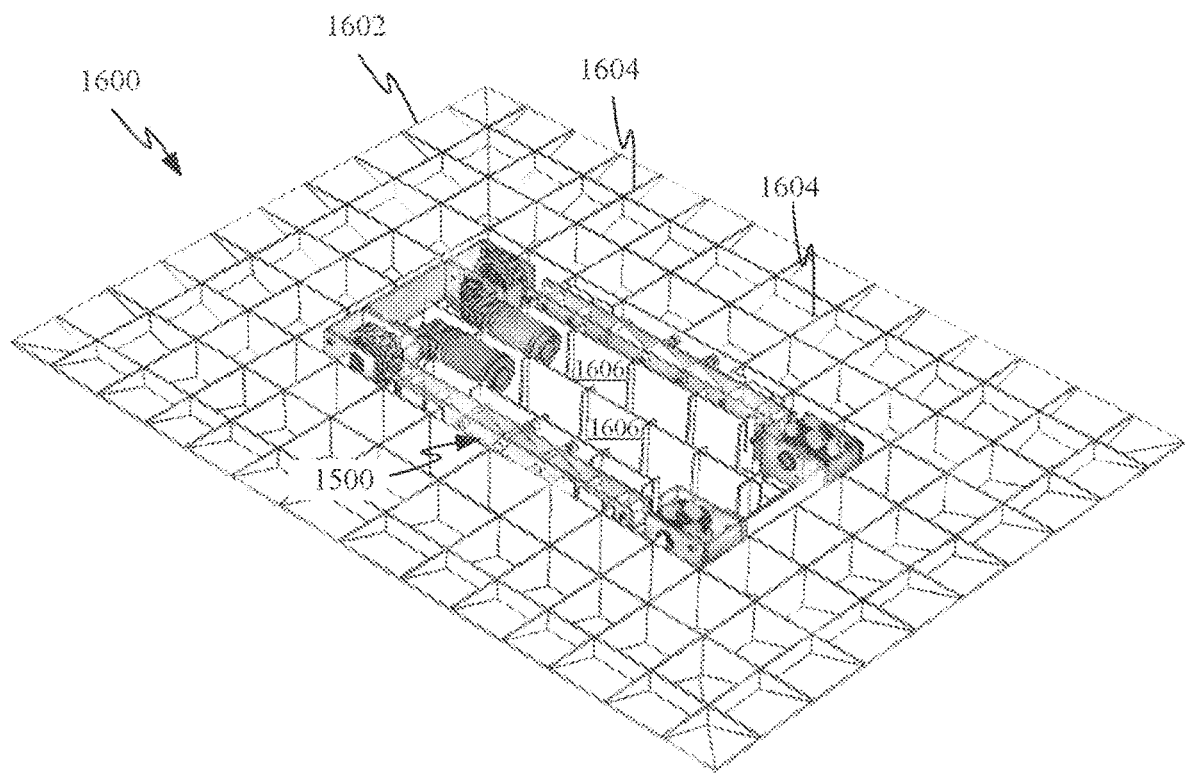
FIG. 16 shows a perspective view of a bottom surface of a platform, which incorporates the alternative suspension depicted in FIG. 15.

FIG. 16 shows a perspective view of a bottom surface of platform 1600, which incorporates the alternative suspension 1500 depicted in FIGS. 15A-15C. As depicted, platform 1600 includes a platform housing 1602 that defines a series of structural ribs 1604 that span a periphery of platform housing 1602. In the peripheral region structural ribs 1604 are arranged in a grid pattern. In a central region of platform housing 1602 structural ribs 1606 only run in a single direction and are broken up to allow space to attach suspension 1500 within the central region.

Figure 17A:
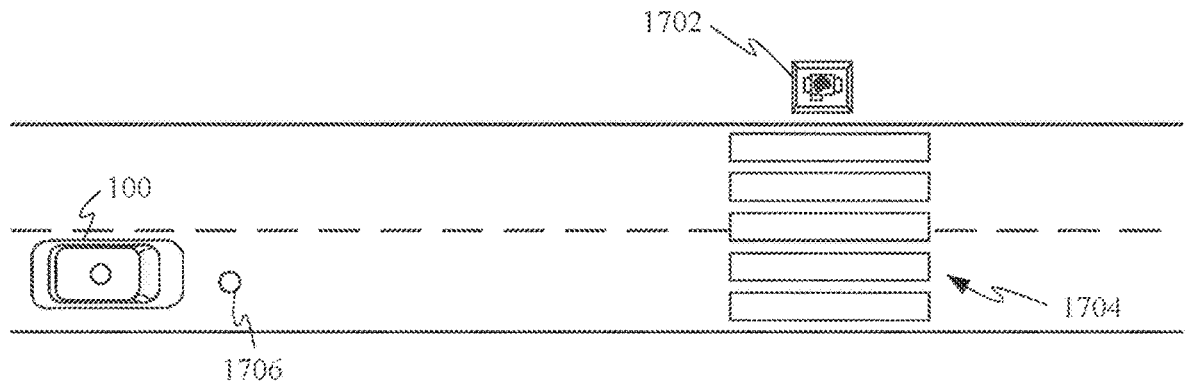
FIG. 17A shows an exemplary testing setup in which an autonomous platform with a pedestrian target mounted atop it is positioned at the entrance to a cross-walk.

FIG. 17A shows an exemplary testing setup in which an autonomous platform 1702 with a pedestrian target mounted atop it is positioned at the entrance to a cross-walk 1704. When AV 100 reaches a predetermined position 1706, autonomous platform 1702 can be configured to traverse cross-walk 1704. Arrival of AV 100 at position 1706 can be determined in a number of ways. For example, a sensor can be embedded within the road at position 1706 and configured to identify passage of AV 100. In some embodiments, the sensor can be an RFID reader configured to emit an electromagnetic field to sense passage of an RFID tag secured to a forward portion of AV 100. The RFID reader can then transmit a signal to autonomous platform 1702 relaying that AV 100 has arrived at position 1706. In some embodiments, an on-board optical sensor can be used to determine when AV 100 has arrived at position 1706. The optical sensor can be configured to measure the size of a target or feature positioned on an exterior surface of AV 100, allowing analysis of the imagery to provide distance information. The optical sensor can also be configured to determine distance from AN 100 by measuring a distance between features separated by a known distance.

A path taken by autonomous platform 1702 can be a constant speed straight path or it can vary substantially. In some embodiments the path taken by autonomous platform 1702 can be based on a manual or programmatic input. For example, a test manager can manually input directional commands that cause autonomous platform 1702 to do a straight traversal across cross-walk 1704 or a more meandering path that can vary in direction and speed while staying within the bounds of cross-walk 1704.

Regardless of the type of input provided to autonomous platform 1702, it is important that autonomous platform 1702 is able to repeat the same set of movements so that improvements to the autonomous management of AV 100 can be tracked in the event AV 100 is struggling with a particular scenario. Autonomous platform 1702 can perform the movements multiple times by recording instructions and/or a series of positions it occupies during a particular test run. This can allow for the movements to be repeated with precision. It can also be desirable for autonomous platform 1702 to have the capability to make adjustments or modifications to a previous set of input commands. This may be helpful where AV 100 performs perfectly to the traversal of autonomous platform 1702 across cross-walk 1704, as it allows testers to see if specific changes to the movement of autonomous platform 1702 across cross-walk 1704 causes a failure in the performance of AV 100. For example, autonomous platform can be configured to make controlled adjustments in speed and/or direction to ensure AV 100 is able to react accordingly to a wide variety of scenarios. In addition to providing a large number of controlled scenario variations, these autonomous adjustments also help reduce the amount of time needed by individuals to set up the scenarios as one doesn't need to have a dedicated worker driving every autonomous platform 1702.

Figure 17B:
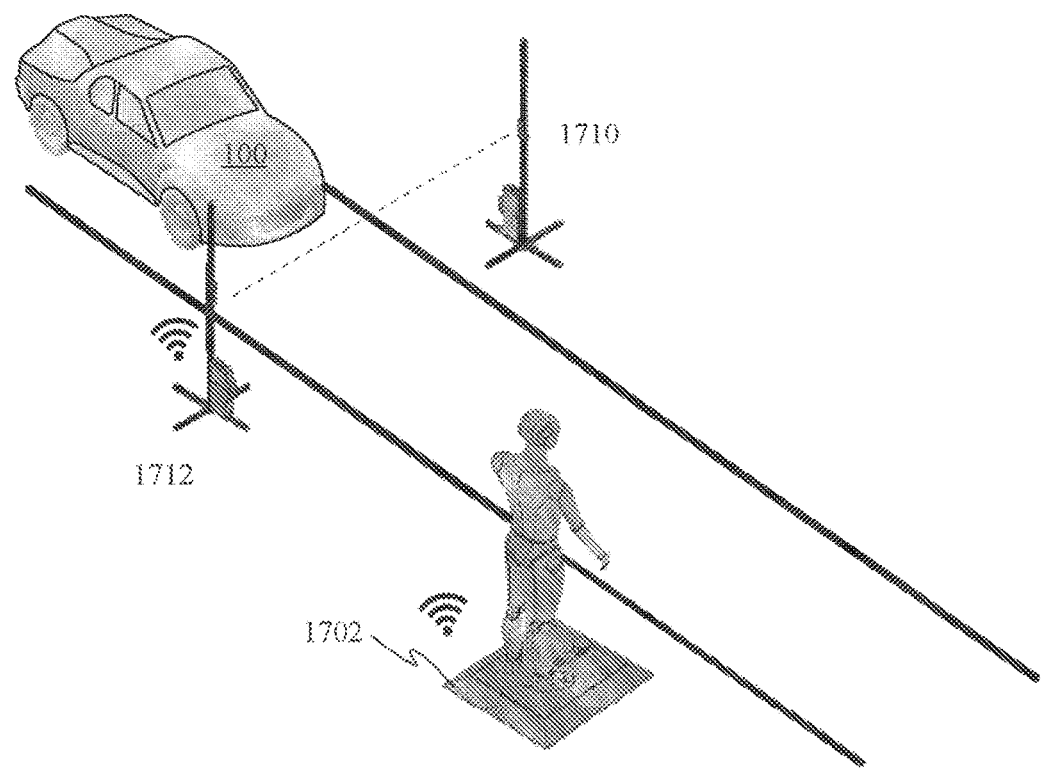
FIG. 17B shows a perspective view of another testing setup in which a laser transmitter and a laser receiver are employed to determine when an autonomous vehicle has reached a predetermined location.

FIG. 17B shows a perspective view of another testing setup in which a laser transmitter 1710 and laser receiver 1712 are employed to determine when AV 100 has reached a predetermined location. The use of a laser detection system may provide a quicker response than an RFID reader as a signal can be transmitted as soon as AV 100 disrupts laser receiver 1712 from receiving the laser transmitted by laser transmitter 1710. In some embodiments, the laser detection system can also be configured to transmit the speed of AV 100 at the predetermined location by measuring how long the laser is blocked. The speed of AV 100 at the predetermined location may also be used to determine when autonomous platform 1702 begins movement and/or at what speed the movement is carried out. This could be useful in a case a driver was maneuvering AV 100 at different speeds and performance of the anti-collision system necessitates autonomous platform 1702 being positioned for a collision with a front of AV 100. In some embodiments, an onboard sensor of autonomous platform 1702 may be used to assist in positioning autonomous platform 1702 in a particular position relative to AV 100 at a time of contact. For example, while initial movement and direction of autonomous platform 1702 can be made in accordance with detection of AV 100 at a predetermined position, one or more sensors such as a LIDAR, RADAR or Imagery Sensor can be used to provide cuing to autonomous platform 1702 so it is positioned as intended prior to its closest point of approach to AV 100.

Figure 18A:
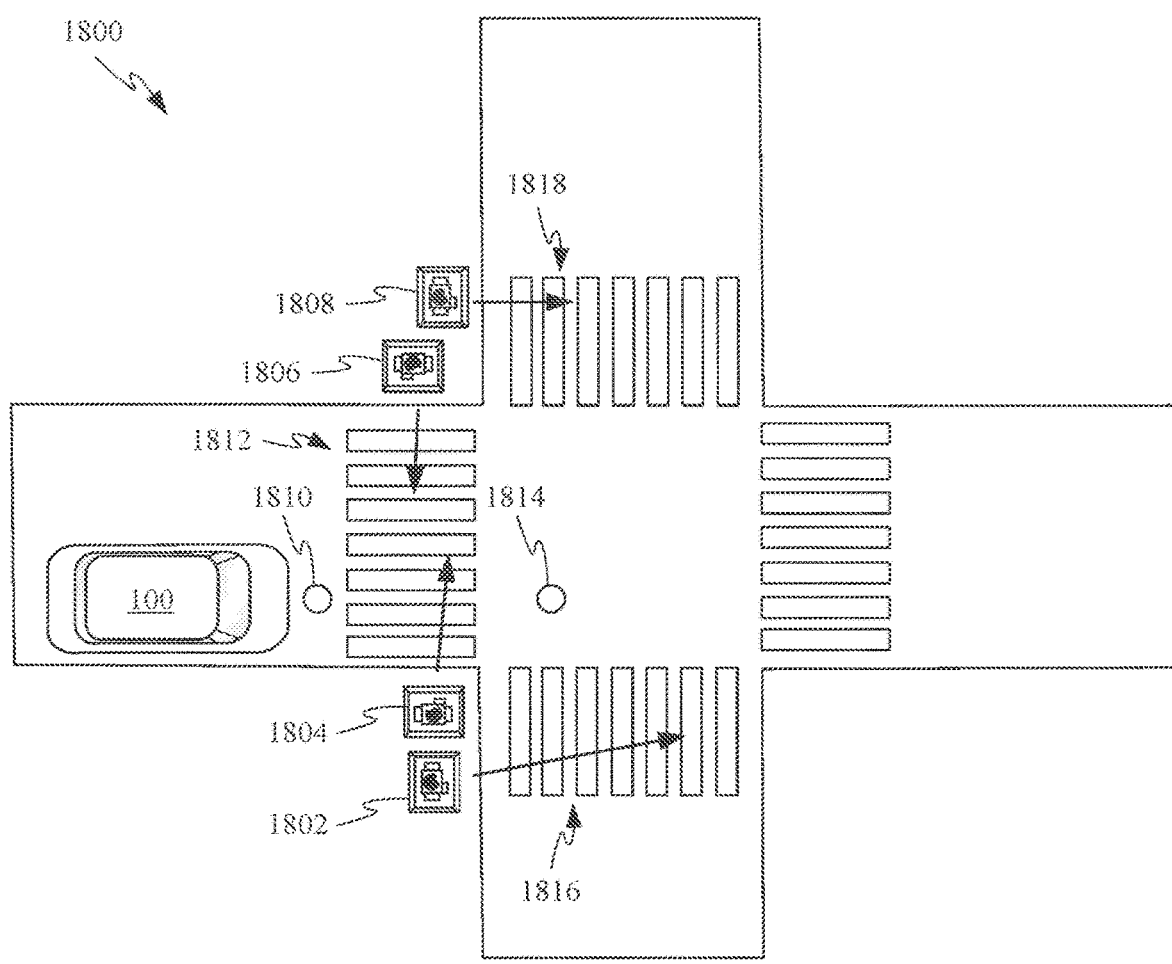
FIGS. 18A-18B show top views of an exemplary intersection testing setup for an autonomous vehicle with multiple autonomous platforms configured to execute different movement patterns.
Figure 18B:
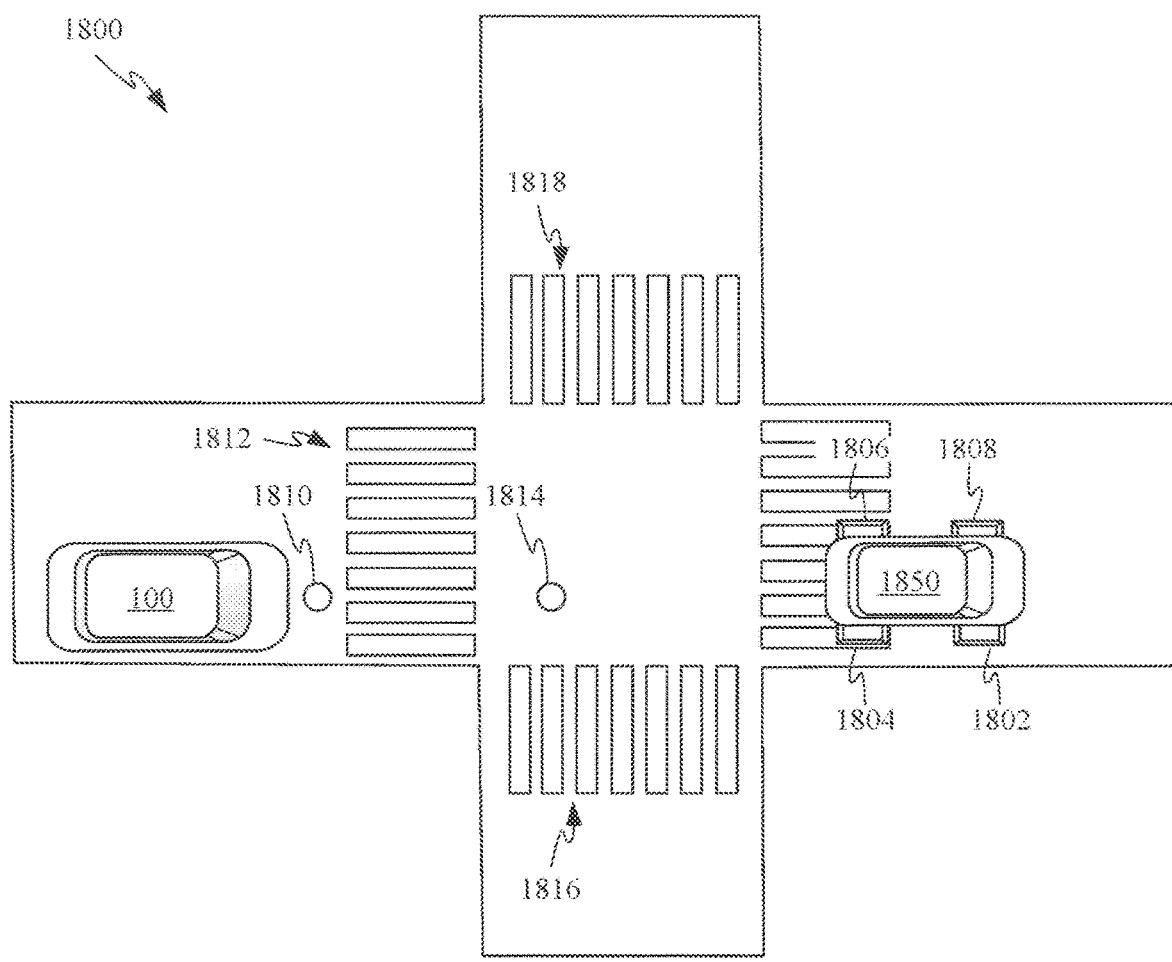

FIG. 18A shows a top view of an exemplary intersection testing setup 1800 for AV 100 with multiple autonomous platforms 1802-1808 configured to execute different movement patterns. Autonomous platforms 1802-1808 can be configured to execute their movement patterns in response to AV 100 arriving at a singular predetermined location or autonomous platforms 1802 can be configured to execute movement platforms in response to AV 100 arriving at different predetermined positions. For example, when AV 100 arrives at position 1810, autonomous platforms 1804 and 1806 can be configured to traverse crosswalk 1812 and when AV 100 reaches position 1814 autonomous platforms 1802 and 1808 traverse crosswalks 1816 and 1818 respectively. In some embodiments, based on a position and/or speed of platform 1802 within crosswalk 1816 detected by one or more sensors of AV 100, AV 100 may decide to slow down or stop prior to making a right turn crossing through crosswalk 1816. In some embodiments, autonomous platforms 1802-1808 can be configured to augment readings from its position sensor or sensors by using an onboard sensor to determine a position of FIG. 18B shows a top view of testing setup 1800 with autonomous platforms 1802-1808 cooperating to carry vehicular target 1850 that can take the form of an inflatable vehicular target. Autonomous platforms 1802-1808 can be configured to maintain a formation to carry a large target such as vehicular target 1850. Sensors aboard autonomous platforms 1802 can be configured to help maintain the relative positioning of autonomous platforms 1802-1808. In some embodiments, one of autonomous platforms 1802-1808 can be configured to guide motion of vehicular target 1850 and the other autonomous platforms are configured to follow changes in direction in speed of the one autonomous platform based solely upon feedback from onboard sensors or alternatively be configured to receive wireless control signals from the controlling autonomous platform and/or cuing from onboard sensors. In some embodiments, vehicular target 1850 can be magnetically coupled to only a single one of autonomous platforms 1802-1808. This configuration allows for easier detachment of vehicular target from the autonomous platforms in the event of a collision.

Autonomous platforms 1802-1808 can be further configured to adjust their operation in response to AV 100 arriving at positions 1810 and 1814. For example, autonomous platforms 1802-1808 can be configured to slow down in response to AV 100 arriving at position 1810 and come to a complete stop when AV 100 arrives at position 1814.

Example Process for Controlling a Self-Propelled Platform

Figure 19:
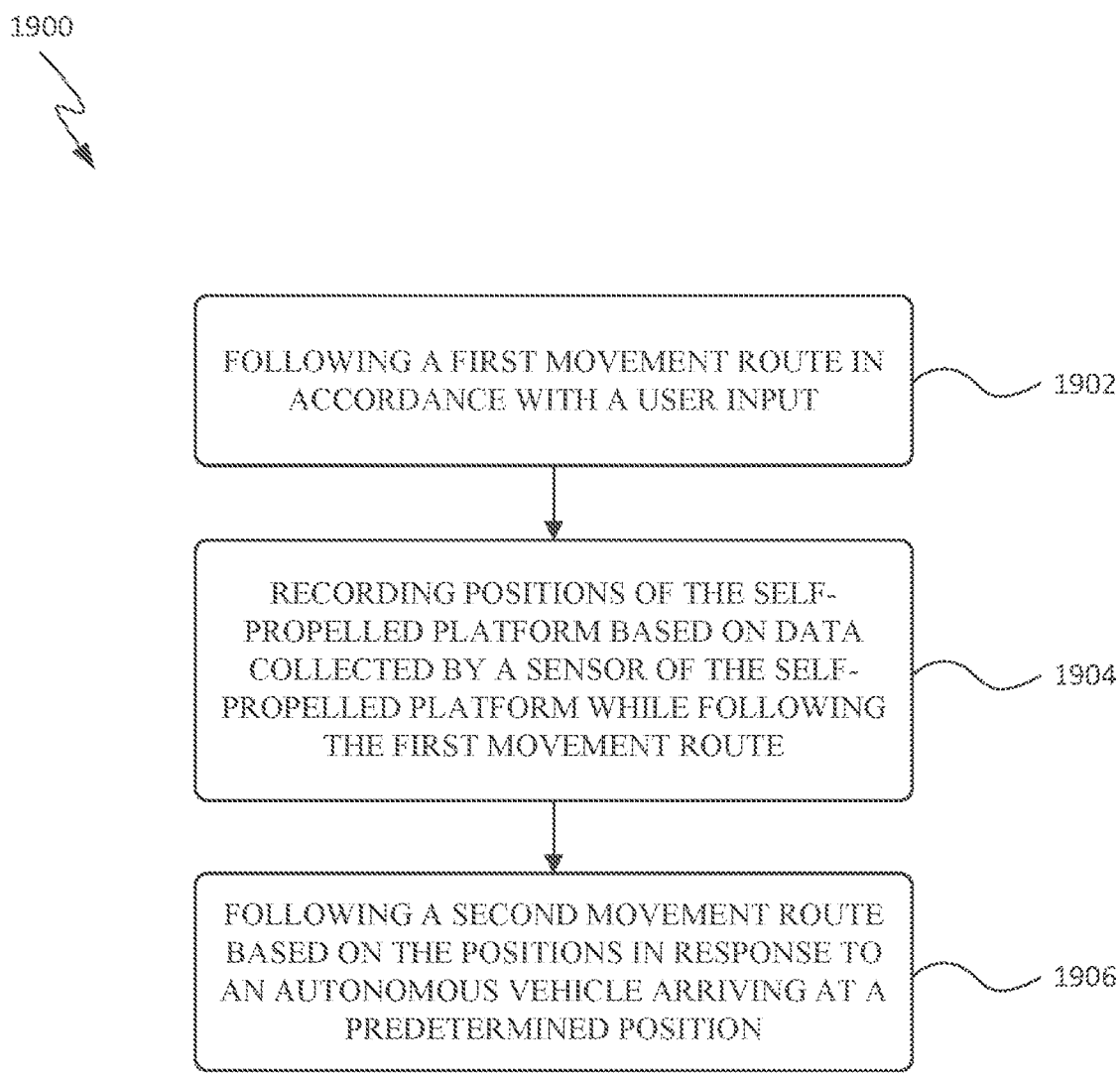
FIG. 19 is a flow chart of an example process for causing a self-propelled platform to follow a first movement route in accordance with a user input.

FIG. 19 is a flow chart of an example process 1900 for controlling a self-propelled platform. At 1902 a processor of the self-propelled platform causes the self-propelled platform to move based on a first movement route in accordance with a user input (e.g., a user input received by the processor). In some embodiments, the processor can be configured to supply inputs to motors powering the self-propelled platform to effectuate movement and maneuver of the self-propelled platform based on the first movement route. The self-propelled platform can be constructed in accordance with any of the descriptions found in FIGS. 11A-16. In some embodiments, the user input can be received by the self-propelled platform prior to execution of the movement and stored in local or cloud-based computer storage as a subroutine that includes a desired direction and rate of movement of the self-propelled platform. The user input could alternatively be input by a remote input control, allowing an individual controlling the self-propelled platform with the remote input control to specify a specific path relative to the surroundings of the self-propelled platform in real-time.

At 1904, during movement of the self-propelled platform, positions of the self-propelled platform at particular times or at particular velocities are recorded in computer memory as a movement route. The position information can be recorded in a number of different reference frames. For example, it may be desirable for the self-propelled platform to always traverse the same portion of a testing setup. Alternatively, it may be more advantageous for the movement to be based entirely or at least in part upon movement of the self-propelled platform relative to a self-propelled vehicle undergoing testing. The position data can be obtained from one or more systems aboard the self-propelled platform including, e.g., a satellite navigation system and an optical or RADAR sensor. On-board sensors capable of providing data about objects surrounding the self-propelled platform are useful in recording the first movement route with respect to one or more other self-propelled vehicles.

At 1906, the self-propelled vehicle can be configured to follow a second movement route based on the recorded positions of the self-propelled vehicle during the first movement route. In some embodiments, the second movement route can be exactly the same or as close to exactly the same as the first movement route as possible given the accuracy of the recorded positions.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

Example Embodiments

Clause 1: A self-propelled platform, comprising: a plurality of wheels;
a motor configured to drive at least one of the plurality of wheels;
a platform housing comprising a support surface configured to carry at least one target and a sloped periphery configured to accommodate passage of an autonomous vehicle over the platform housing; and
a suspension comprising a plurality of springs coupling the plurality of wheels to the platform housing, the plurality of springs configured to transition the platform from a first state to a second state in response to a threshold amount of weight being applied to the platform housing, wherein the platform housing is lower in the second state than it is in the first state.

Clause 2: The self-propelled platform of clause 1, further comprising a retractable sensor, wherein the retractable sensor protrudes from the platform housing when the suspension is in the first state and is retracted within the platform housing when the suspension is in the second state.

Clause 3: The self-propelled platform of clause 2, wherein the retractable sensor is mechanically coupled to one of the plurality of wheels by a spring and at least one linkage.

Clause 4: The self-propelled platform of any of clauses 2-3, wherein the retractable sensor comprises an optical sensor.

Clause 5: The self-propelled platform of any of clauses 2-3, wherein the retractable sensor comprises a LiDAR sensor.

Clause 6: The self-propelled platform of clause 2, wherein the retractable sensor is a first retractable sensor and the self-propelled platform further comprises a second retractable sensor facing in a different direction than the first retractable sensor.

Clause 7: The self-propelled platform of any of clauses 2-6, further comprising a motor configured to transition the retractable sensor between the protruding position and the retracted position based on a determined proximity of the autonomous vehicle to the self-propelled platform.

Clause 8: The self-propelled platform of any of clauses 1-7, wherein the sloped periphery of the platform housing and the plurality of wheels are in direct contact with a surface upon which the self-propelled platform rests when the self-propelled platform is in the second state.

Clause 9: The self-propelled platform of any of clauses 1-8, wherein the suspension comprises a rigid chassis coupled to each wheel of the plurality of wheels, wherein the chassis is coupled to the platform housing by the plurality of springs.

Clause 10: The self-propelled platform of any of clauses 1-8, wherein a first wheel of the plurality of wheels is coupled to the platform housing by a first spring of the plurality of springs and a second wheel of the plurality of wheels is coupled to the platform housing by a second spring of the plurality of springs.

Clause 11: The self-propelled platform of any of clauses 1-10, wherein the threshold amount of weight is between 25 kg and 75 kg.

Clause 12: The self-propelled platform of clause 1, further comprising a weight on wheels sensor configured to distinguish between the first state and the second state, wherein the motor is configured to cease operation in response to sensor data from the weight on wheels sensor indicating the self-propelled platform is in the second state.

Clause 13: The self-propelled platform of any of clause 1-12, wherein the motor is a first motor and the self-propelled platform further comprises a second motor configured to drive a second wheel of the plurality of wheels, wherein the first motor is configured to drive a first wheel of the plurality of wheels independent from the second motor.

Clause 14: The self-propelled platform of clause 13, wherein a drive axis of the first motor is aligned with an axis of rotation of a first wheel of the plurality of wheels.

Clause 15: The self-propelled platform of any of clauses 1-14, wherein in the first state the self-propelled platform has an overall height of less than 8 cm.

Clause 16: The self-propelled platform of any of clause 1-15, wherein an outside surface of the platform housing comprises at least one permanent magnet configured to secure a target with a magnetically attractable plate or magnet to the platform housing.

Clause 17: The self-propelled platform of clause 16, wherein the target is shaped to simulate a pedestrian or cyclist.

Clause 18: The self-propelled platform of any of clauses 1-17, further comprising a wireless communication module configured to receive commands that change a movement route of the self-propelled platform.

Clause 19: The self-propelled platform of clause 1, further comprising:
a retractable sensor, wherein the retractable sensor protrudes from the platform housing when the suspension is in the first state and is retracted within the platform housing when the suspension is in the second state;
a motor configured to transition the retractable sensor between the protruding position and the retracted position; and
a wireless communication module configured to receive commands that direct the motor to transition the retractable sensor between the protruding and retracted positions.

Clause 20: A self-propelled platform, comprising:
a sensor;
at least one processing circuit;
a wireless communication module; and
at least one non-transitory storage media storing instructions which, when executed by the at least one processing circuit, cause performance of operations comprising:

following a first movement route in accordance with a user input;

recording a plurality of positions of the self-propelled platform based on data collected by the sensor while following the first movement route; and following a second movement route based on the plurality of positions in response to an autonomous vehicle arriving at a predetermined position.

Clause 21: The self-propelled platform of clause 20, wherein the instructions which, when executed by the at least one processing circuit, cause performance of operations comprising synchronously moving with at least one other self-propelled platform.

Clause 22: The self-propelled platform of any of clauses 20-21, wherein the self-propelled platform moves synchronously with the at least one other self-propelled platform by communicating directly with the at least one other self-propelled platform using the wireless communication module and wherein the self-propelled platform is configured to carry a target in cooperation with the at least one other self-propelled platform.

Clause 23: The self-propelled platform of clause 20, wherein the wireless communication module is configured to receive data notifying the self-propelled platform that the autonomous vehicle has arrived at the predetermined position.

Clause 24: The self-propelled platform of clause 23, wherein the autonomous vehicle is determined to have arrived at the predetermined position based on a communication received by the wireless communication module indicating that an RFID tag positioned on the autonomous vehicle has been detected at the predetermined position.

Clause 25: The self-propelled platform of clause 20-24, wherein the plurality of positions are based at least in part on optical imagery gathered by the sensor.

Clause 26: The self-propelled platform of clause 20-25, wherein the plurality of positions are defined based on a position of the self-propelled platform relative to the autonomous vehicle.

Clause 27: The self-propelled platform of clause 20, wherein the instructions which, when executed by the at least one processing circuit, cause performance of operations comprising determining a position of the self-propelled platform relative to the autonomous vehicle using optical imagery generated by the sensor that includes at least one reference point located on the autonomous vehicle.

Clause 28: The self-propelled platform of clause 20, wherein the sensor comprises a LiDAR sensor configured to determine a position of the autonomous vehicle relative to the self-propelled platform.

Clause 29: The self-propelled platform of clause 28, wherein the LiDAR sensor is configured to determine a position of the autonomous vehicle relative to the predetermined position based on the position of the self-propelled platform.

Clause 30: The self-propelled platform of clause 29, wherein the LiDAR sensor is configured to determine the position of the self-propelled platform based on sensor data generated by the LiDAR sensor showing a position of at least one stationary object.

Clause 31: The self-propelled platform of clause 20, wherein the sensor comprises an optical sensor and the self-propelled platform further comprises a satellite navigation system configured to validate position information derived from imagery generated by the optical sensor.

Clause 32: The self-propelled platform of clause 20-31, wherein the instructions which, when executed by the at least one processing circuit, cause performance of operations comprising offsetting the second movement route from the plurality of positions to validate a response of the autonomous vehicle to changes in routing of the self-propelled platform.

Clause 33: The self-propelled platform of clause 20, wherein the instructions which, when executed by the at least one processing circuit, cause performance of operations comprising determining the plurality of positions based on the data collected by the sensor during the first movement route.

Clause 34: The self-propelled platform of clause 32, wherein the at least one processing circuit comprises a control circuit that is configured to direct the self-propelled platform to follow the first movement route and the second movement route.

Clause 35: The self-propelled platform of clause 20, wherein the autonomous vehicle is determined to have arrived at the predetermined position when the autonomous vehicle triggers a laser beam transmitter.

Clause 36: The self-propelled platform of clause 20, wherein the sensor is configured to determine a position of the autonomous vehicle on a planned movement path of the autonomous vehicle.

Clause 37: The self-propelled platform of clause 36, wherein the second movement route crosses the planned movement path and wherein the at least one processing circuit comprises a control circuit that is configured to initiate following the second movement route so that the self-propelled platform crosses the planned movement path a predefined distance in front of the autonomous vehicle.

Clause 38: A method performed by a self-propelled platform, comprising:

following a first movement route in accordance with a user input;

recording a plurality of positions of the self-propelled platform based on data collected by a sensor of the self-propelled platform while following the first movement route; and following a second movement route based on the plurality of positions in response to an autonomous vehicle arriving at a predetermined position.

Clause 39: A non-transitory computer-readable storage medium storing instructions configured to be executed by at least one circuit of a self-propelled platform that cause the self-propelled platform to carry out steps that include:

following a first movement route in accordance with a user input;

recording a plurality of positions of the self-propelled platform based on data collected by a sensor of the self-propelled platform while following the first movement route; and following a second movement route based on the plurality of positions in response to an autonomous vehicle arriving at a predetermined position.

What is claimed is:

1. A self-propelled platform, configured to operate within a test environment, the self-propelled platform comprising:
   a sensor;
   at least one processing circuit;
   a wireless communication module; and
   at least one non-transitory storage media storing instructions which, when executed by the at least one processing circuit, cause performance of operations comprising:
   navigating along a first movement route in accordance with a user input;

recording, as a second movement route, a plurality of positions of the self-propelled platform based on data collected by the sensor during navigation along the first movement route; and in response to an autonomous vehicle arriving at a predetermined position, navigating along the second movement route within the test environment.

2. The self-propelled platform of claim 1, wherein the instructions which, when executed by the at least one processing circuit, cause performance of operations comprising synchronously moving with at least one other self-propelled platform.

3. The self-propelled platform of claim 2, wherein the self-propelled platform is configured to move synchronously with the at least one other self-propelled platform by communicating directly with the at least one other self-propelled platform using the wireless communication module and wherein the self-propelled platform is configured to carry a target in cooperation with the at least one other self-propelled platform.

4. The self-propelled platform of claim 1, wherein the wireless communication module is configured to receive data notifying the self-propelled platform that the autonomous vehicle has arrived at the predetermined position.

5. The self-propelled platform of claim 4, wherein the autonomous vehicle is determined to have arrived at the predetermined position based on a communication received by the wireless communication module indicating that an RFID tag positioned on the autonomous vehicle has been detected at the predetermined position.

6. The self-propelled platform of claim 1, wherein the plurality of positions are based at least in part on optical imagery gathered by the sensor.

7. The self-propelled platform of claim 1, wherein the plurality of positions are defined based on a position of the self-propelled platform relative to the autonomous vehicle.

8. The self-propelled platform of claim 1, wherein the instructions which, when executed by the at least one processing circuit, cause performance of operations comprising determining a position of the self-propelled platform relative to the autonomous vehicle using optical imagery generated by the sensor that includes at least one reference point located on the autonomous vehicle.

9. The self-propelled platform of claim 1, wherein the sensor comprises a LiDAR sensor configured to determine a position of the autonomous vehicle relative to the self-propelled platform.

10. The self-propelled platform of claim 9, wherein the LiDAR sensor is configured to determine a position of the autonomous vehicle relative to the predetermined position based on the position of the self-propelled platform.

11. The self-propelled platform of claim 10, wherein the LiDAR sensor is configured to determine the position of the self-propelled platform based on sensor data generated by the LiDAR sensor showing a position of at least one stationary object.

12. The self-propelled platform of claim 1, wherein the sensor comprises an optical sensor and the self-propelled platform further comprises a satellite navigation system configured to validate position information derived from imagery generated by the optical sensor.

13. The self-propelled platform of claim 1, wherein the instructions which, when executed by the at least one processing circuit, cause performance of operations comprising offsetting the second movement route from the plurality of positions to validate a response of the autonomous vehicle to changes in routing of the self-propelled platform.

14. The self-propelled platform of claim 1, wherein the instructions which, when executed by the at least one processing circuit, cause performance of operations comprising determining the plurality of positions based on the data collected by the sensor during the first movement route.

15. The self-propelled platform of claim 1, wherein the at least one processing circuit comprises a control circuit that is configured to direct the self-propelled platform to follow the first movement route and the second movement route.

16. The self-propelled platform of claim 1, wherein the autonomous vehicle is determined to have arrived at the predetermined position when the autonomous vehicle triggers a laser beam transmitter.

17. The self-propelled platform of claim 1, wherein the sensor is configured to determine a position of the autonomous vehicle on a planned movement path of the autonomous vehicle.

18. The self-propelled platform of claim 17, wherein the second movement route crosses the planned movement path and wherein the at least one processing circuit comprises a control circuit that is configured to initiate following the second movement route so that the self-propelled platform crosses the planned movement path a predefined distance in front of the autonomous vehicle.

19. A method performed by a self-propelled platform configured to operate within a test environment, the self-propelled platform, comprising:

navigating along a first movement route in accordance with a user input;

recording, as a second movement route, a plurality of positions of the self-propelled platform based on data collected by a sensor of the self-propelled platform during navigation along the first movement route; and in response to an autonomous vehicle arriving at a predetermined position, navigating along the second movement route within the test environment.

20. A non-transitory computer-readable storage medium storing instructions configured to be executed by at least one circuit of a self-propelled platform configured to operate within a test environment, wherein the instructions cause the self-propelled platform to perform operations that include:

navigating along a first movement route in accordance with a user input;

recording, as a second movement route, a plurality of positions of the self-propelled platform based on data collected by a sensor of the self-propelled platform during navigation along the first movement route; and following in response to an autonomous vehicle arriving at a predetermined position, navigating along the second movement route within the test environment.

* * * * *

UNITED STATES PATENT AND TRADEMARK OFFICE
CERTIFICATE OF CORRECTION

PATENT NO. : 12,246,655 B2
APPLICATION NO. : 18/056168
DATED : March 11, 2025
INVENTOR(S) : Lucas Kuwae et al.

Page 1 of 1

It is certified that error appears in the above-identified patent and that said Letters Patent is hereby corrected as shown below:

In the Specification

In Column 6, Line 36, delete "Level I vehicles" and insert --Level 1 vehicles--.

In Column 8, Line 32, delete "a LIDAR sensor," and insert --a LiDAR sensor,--.

In Column 8, Line 37, delete "environment and or the" and insert --environment and/or the--.

In Column 16, Line 5, delete "line A-A The" and insert --line A-A. The--.

In Column 16, Line 20, delete "line A-A The" and insert --line A-A. The--.

In Column 19, Line 43, delete "a LIDAR, RADAR" and insert --a LiDAR, RADAR--.

In the Claims

In Column 26, Claim 20, Line 56 (Approx.), delete "and following in" and insert --and in--.

Signed and Sealed this
Twenty-ninth Day of April, 2025

Coke Morgan Stewart
*Acting Director of the United States Patent and Trademark Office*